US012756187B2

(12) United States Patent
Nook et al.

(10) Patent No.: US 12,756,187 B2
(45) Date of Patent: Oct. 6, 2026

(54) PORTABLE JUMP STARTER AND AIR COMPRESSOR DEVICE

(71) Applicant: The Noco Company, Glenwillow, OH (US)

(72) Inventors: Jonathan Lewis Nook, Gates Mills, OH (US); Matthew Michael Bosway, Queen Creek, AZ (US); William Knight Nook, Sr., Glenwillow, OH (US); James Richard Stanfield, Glendale, AZ (US); James P. McBride, Phoenix, AZ (US); Andrea Carolina Hacker Davidson, Phoenix, AZ (US); Nitish Agrawal, Glenwillow, OH (US); Tom Situ, Glenwillow, OH (US); Derek Michael Underhill, Chandler, AZ (US)

(73) Assignee: The Noco Company, Glenwillow, OH (US)

(*) Notice: Subject to any disclaimer, the term of this patent is extended or adjusted under 35 U.S.C. 154(b) by 521 days.

(21) Appl. No.: 18/548,615

(22) PCT Filed: Mar. 15, 2022

(86) PCT No.: PCT/US2022/020424
§ 371 (c)(1),
(2) Date: Sep. 1, 2023

(87) PCT Pub. No.: WO2022/197731
PCT Pub. Date: Sep. 22, 2022

(65) Prior Publication Data

US 2024/0154412 A1 May 9, 2024

Related U.S. Application Data

(60) Provisional application No. 63/161,177, filed on Mar. 15, 2021.

(51) Int. Cl.
*H02J 1/10* (2006.01)
*B60L 53/30* (2019.01)
(Continued)

(52) U.S. Cl.
CPC .............. *H02J 1/122* (2020.01); *B60L 53/30* (2019.02); *H01M 10/6551* (2015.04);
(Continued)

(58) Field of Classification Search
CPC .... H02J 1/122; H02J 1/084; H02J 7/80; H02J 7/855; H02J 7/52; H01M 10/6551;
(Continued)

(56) References Cited

U.S. PATENT DOCUMENTS 3,548,651 A 12/1970 Itoh
5,220,269 A 6/1993 Chen et al.
(Continued)

FOREIGN PATENT DOCUMENTS

CN 2647616 10/2004
CN 1727233 2/2006
(Continued)

OTHER PUBLICATIONS

English Translation JP 2009008039 A (Year: 2009).*
(Continued)

*Primary Examiner* — Shafiq Mian
(74) *Attorney, Agent, or Firm* — Jones Day

(57) ABSTRACT

A portable jump starter and air compressor device, including a jump starter, air compressor, and/or vacuum cleaner. One or more of the jump starter, air compressor, and/or vacuum cleaner are powered a same or different one or more rechargeable batteries (e.g. one or more Li-ion batteries). The air compressor, for example, includes a piston/valve arrangement configured to allow a piston of the piston/valve
(Continued)

arrangement to move in close proximity to a cylinder head of the cylinder of the air compressor.

14 Claims, 30 Drawing Sheets

(51) Int. Cl.
*H01M 10/6551* (2014.01)
*H01M 50/204* (2021.01)
*H01M 50/271* (2021.01)
*H01M 50/289* (2021.01)
*H02J 1/08* (2006.01)
*H02J 7/00* (2006.01)
*H02J 7/52* (2026.01)
*H02J 7/80* (2026.01)

(52) U.S. Cl.
CPC ....... *H01M 50/204* (2021.01); *H01M 50/271* (2021.01); *H01M 50/289* (2021.01); *H02J 1/084* (2020.01); *H02J 7/52* (2026.01); *H02J 7/80* (2026.01); *H02J 7/855* (2026.01); *H01M 2220/30* (2013.01)

(58) Field of Classification Search
CPC ............. H01M 50/289; H01M 50/204; H01M 50/271; H01M 2220/30; B60L 53/30
See application file for complete search history.

(56) References Cited

U.S. PATENT DOCUMENTS

| | | | | |
|---|---|---|---|---|
| 8,076,900 | B1 | 12/2011 | Brown | |
| 9,819,204 | B2 * | 11/2017 | Miller | H02J 7/663 |
| 10,691,184 | B1 | 6/2020 | Ganta Papa Rao Bala et al. | |
| 11,254,213 | B2 * | 2/2022 | Nook | B60L 3/0046 |
| 2005/0047947 | A1 | 3/2005 | McCombs et al. | |
| 2007/0022875 | A1 * | 2/2007 | Kim | F04B 39/0005 92/172 |
| 2007/0251379 | A1 | 11/2007 | Lund | |
| 2009/0141494 | A1 | 6/2009 | Zhang et al. | |
| 2009/0230783 | A1 | 9/2009 | Weed et al. | |
| 2012/0021260 | A1 | 1/2012 | Yasui et al. | |
| 2014/0093766 | A1 | 4/2014 | Fees et al. | |
| 2016/0061196 | A1 | 3/2016 | Ueda | |
| 2016/0254620 | A1 | 9/2016 | O'Young et al. | |
| 2017/0012448 | A1 * | 1/2017 | Miller | H02J 7/342 |
| 2018/0358664 | A1 | 12/2018 | Zhang et al. | |
| 2020/0122308 | A1 | 4/2020 | Bradley et al. | |
| 2020/0259340 | A1 * | 8/2020 | Nook | B60L 3/0046 |
| 2021/0040940 | A1 | 2/2021 | Zhu | |
| 2021/0047982 | A1 | 2/2021 | Engelmann | |
| 2021/0075235 | A1 | 3/2021 | Nook et al. | |

FOREIGN PATENT DOCUMENTS

| | | | |
|---|---|---|---|
| CN | 101303006 | | 11/2008 |
| CN | 103563164 | | 2/2014 |
| CN | 105386963 | | 3/2016 |
| CN | 210554755 | | 5/2020 |
| CN | 111342525 | | 6/2020 |
| CN | 111370603 | | 7/2020 |
| CN | 111868373 | | 10/2020 |
| CN | 111878358 | | 11/2020 |
| JP | 2009-008039 | | 1/2009 |
| JP | 2009008039 | A * | 1/2009 |
| WO | WO 2005/017358 | | 2/2005 |
| WO | WO 2008/128400 | | 10/2008 |
| WO | WO 2019/143427 | | 7/2019 |
| WO | WO 2020/036643 | | 2/2020 |

OTHER PUBLICATIONS

Patent Cooperation Treaty, Appl. PCT/US2022/020424, International Preliminary Report on Patentability, Sep. 28, 2023.
Patent Cooperation Treaty, Appl. PCT/US2022/020424, International Search Report, Jun. 15, 2022.
IP Australia, Appl. 2022238310, Examination Report No. 1, May 16, 2024.
CNIPA, Appl. 202280021672.3, First Office Action, Feb. 24, 2026.
European Patent Office, Appl. 22772081.0, Extended European Search Report, Mar. 10, 2025.
Canadian Intellectual Property Office, Appl. 3,213,633, Examiner Requisition, Jul. 8, 2025.
Japan Patent Office, Appl. 2023-556810, Office Action, Jun. 20, 2025.
IP Australia, Appl. 2024267039, Examination Report No. 1, Nov. 28, 2025.
IP Australia, Appl. 2024267043, Examination Report No. 1, Nov. 19, 2025.
IP Australia, Appl. 2022238310, Examination Report No. 2, Jul. 10, 2024.
CNIPA, Appl. 202280021672.3, Second Office Action, Jul. 31, 2026.

* cited by examiner

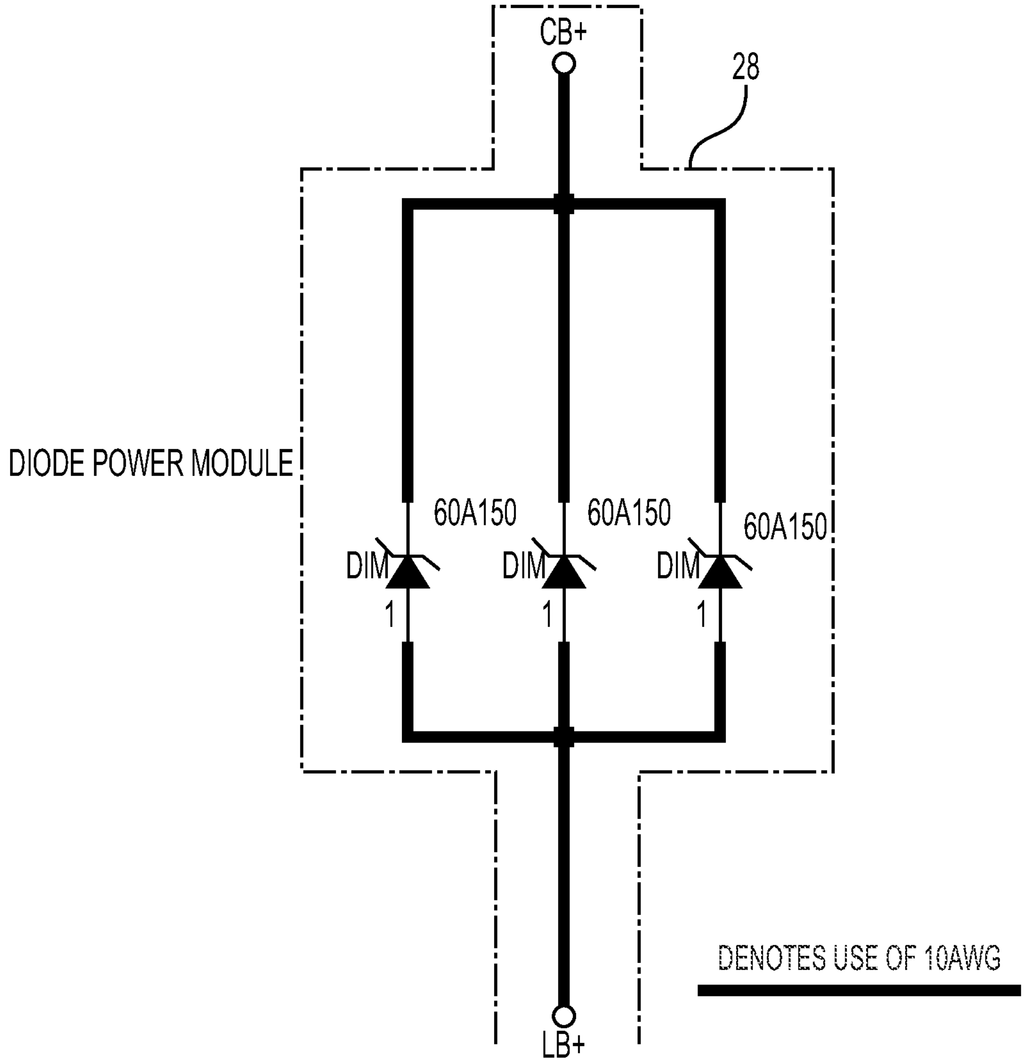
FIG. 2B-1
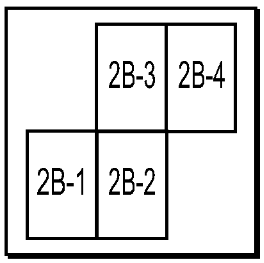

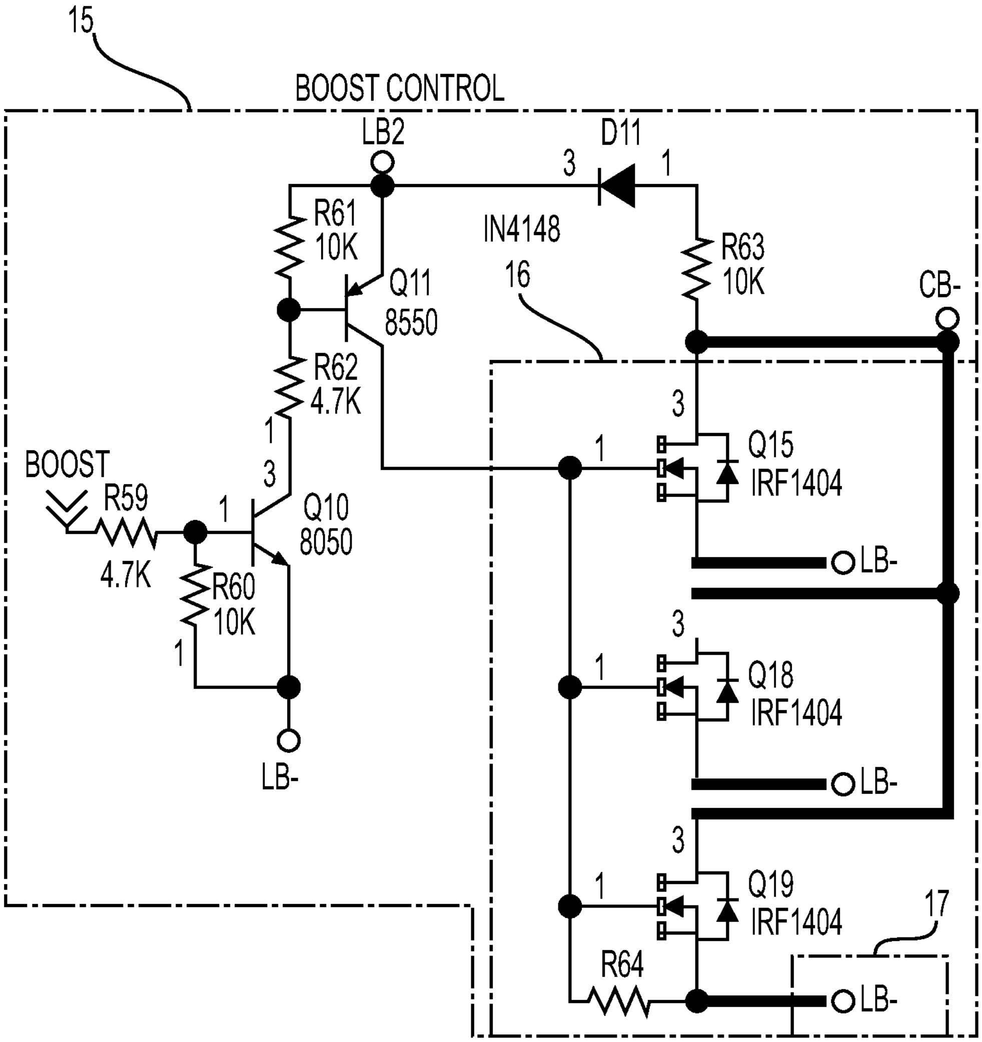
FIG. 2B-2
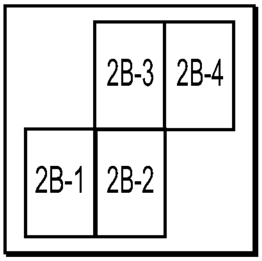

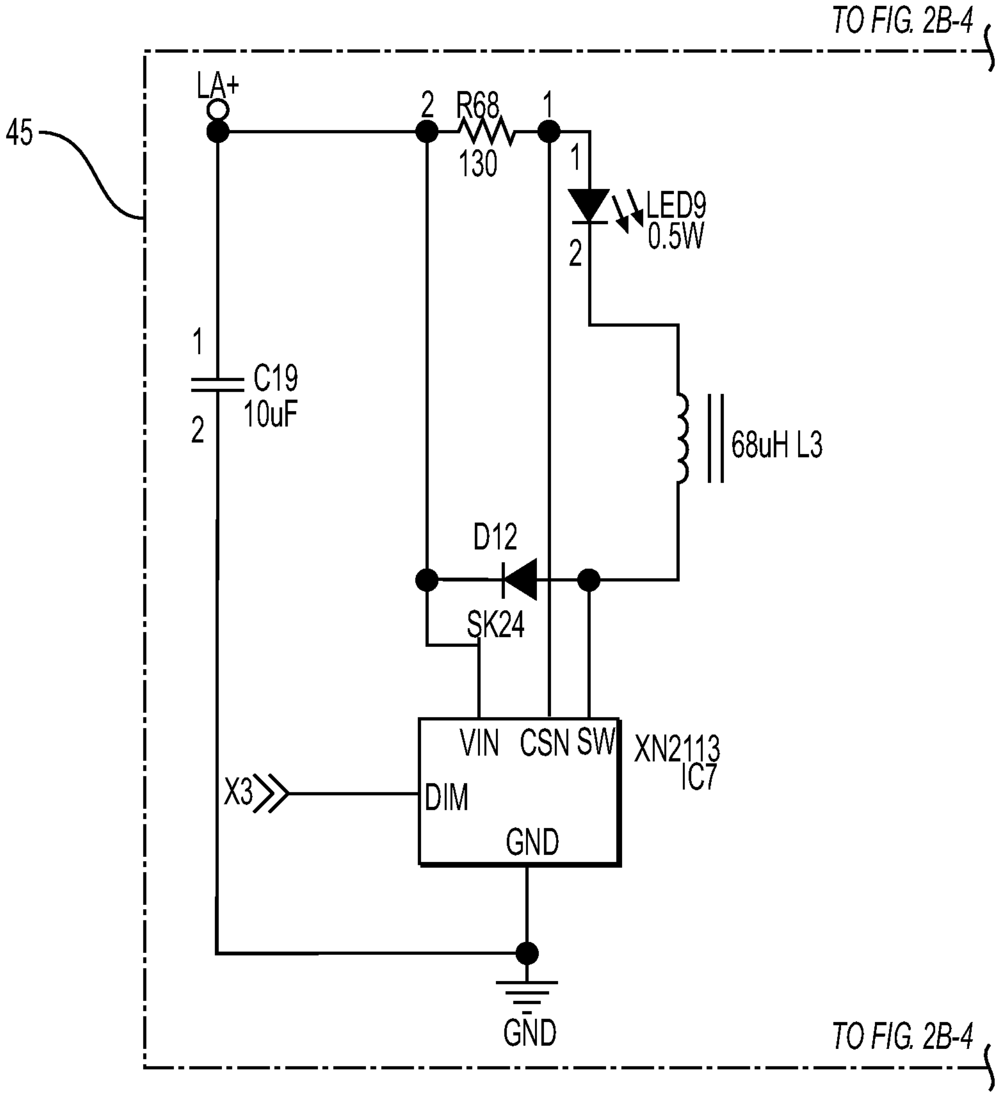
FIG. 2B-3
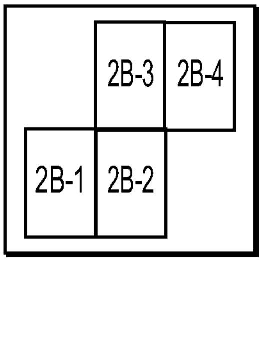

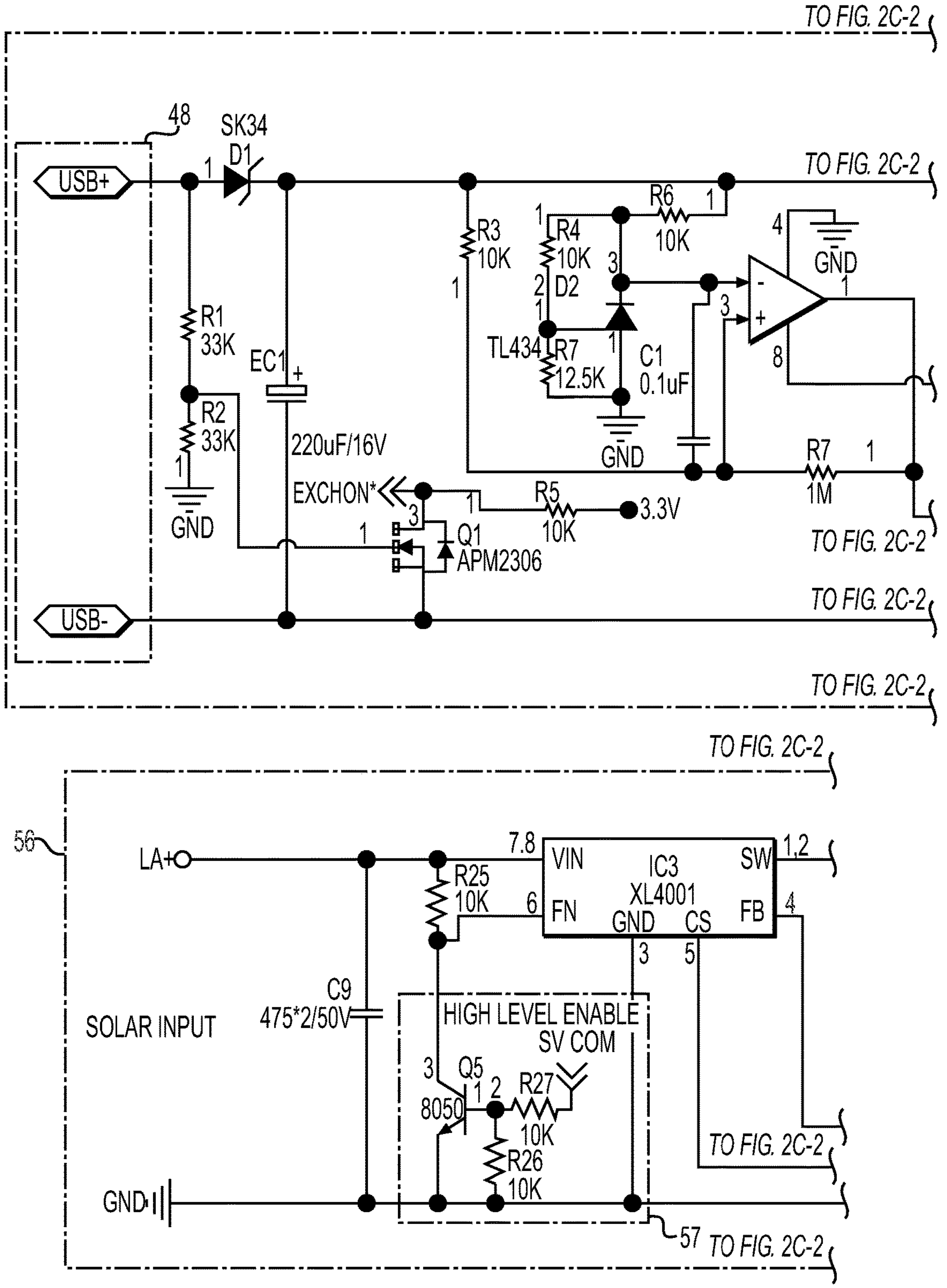
FIG. 2C-1
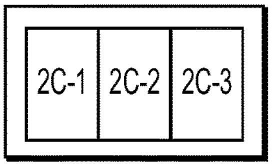

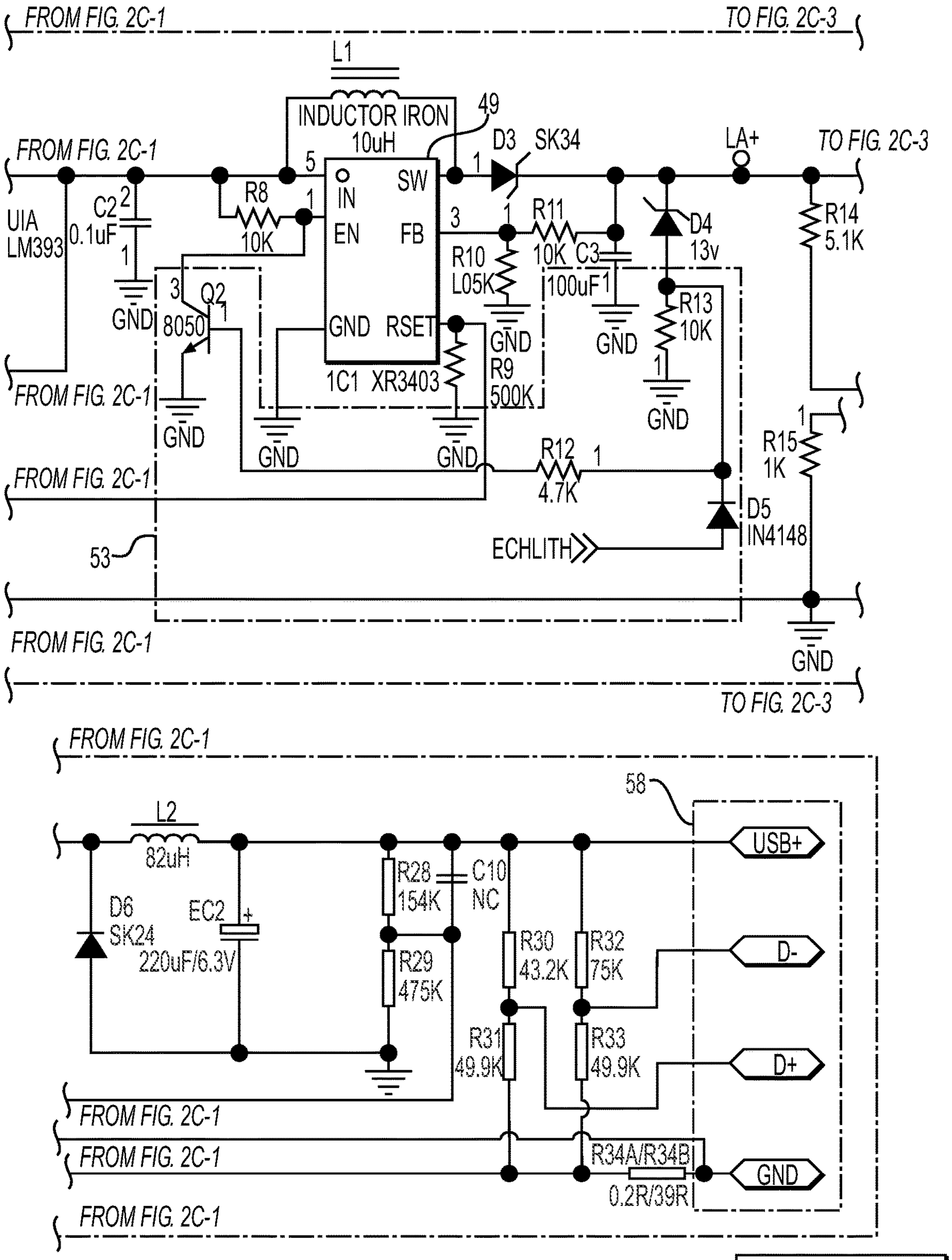
FIG. 2C-2
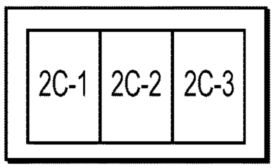

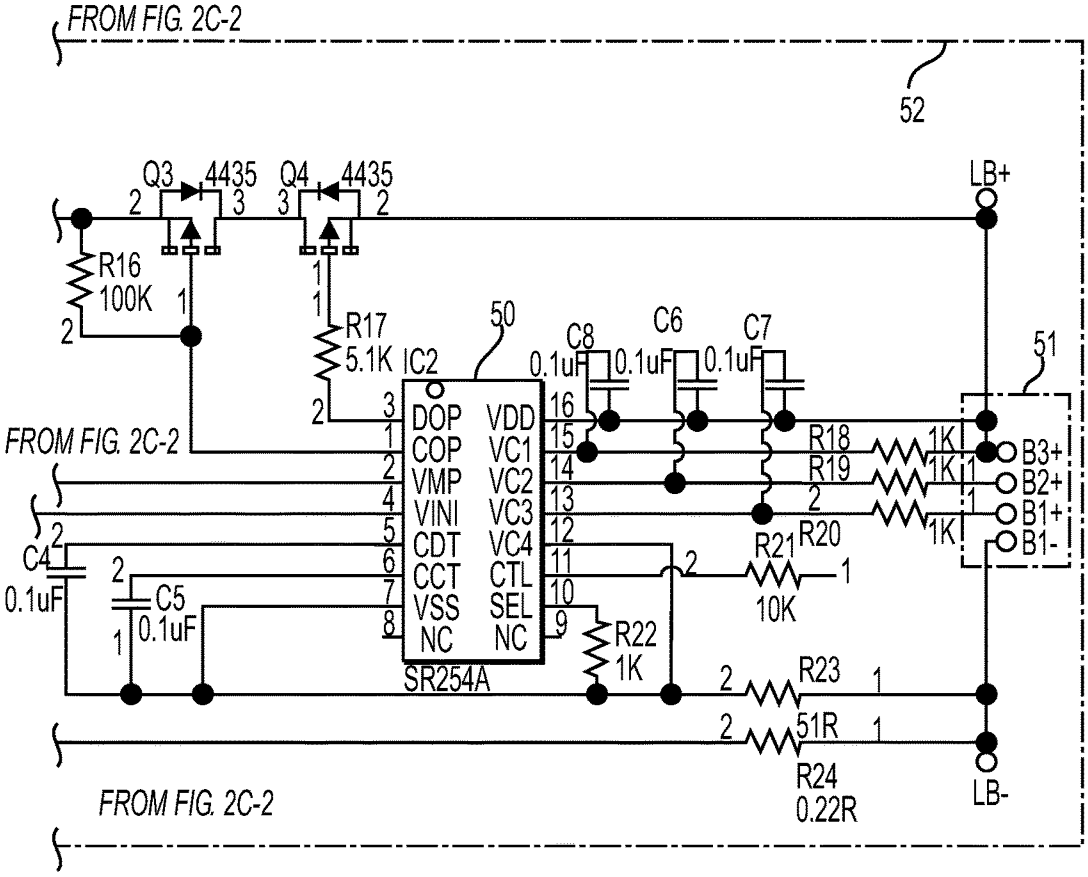
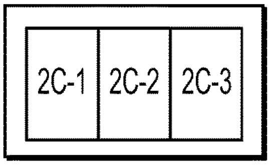
FIG. 2C-3

PORTABLE JUMP STARTER AND AIR COMPRESSOR DEVICE

CROSS-REFERENCE TO RELATED APPLICATIONS

This application is a National Stage Entry of International Patent Application No. PCT/US2022/020424, filed Mar. 15, 2022, which claims the benefit of priority to U.S. Provisional Patent Application No. 63/161,177, filed Mar. 15, 2021, each of which is incorporated by reference in its entirety for all purposes.

FIELD

The present invention is directed to a portable jump start and air compressor device, a portable jump starter/air compressor device, a portable jump starter with an air compressor, a portable jump starter and air compressor and vacuum cleaner device, a portable jump starter/air compressor/vacuum cleaner device, a portable jump starter, a portable air compressor device, and a portable vacuum cleaner device.

For example, a jump starter and air compressor device comprising a rechargeable Li-ion battery for powering the jump starter and/or the air compressor.

As a further example, a jump starter and air compressor and vacuum cleaner device comprising a rechargeable Li-ion battery for powering the jump starter, air compressor and/or the vacuum cleaner.

As an even further example, an air compressor and vacuum cleaner device comprising a rechargeable Li-ion battery for powering the air compressor and/or the vacuum cleaner.

The present invention is further directed to a jump starter device with a battery detection system for providing safety, and a system and method of detecting when the jump starter is connected to a depleted or discharged battery being jump started.

The present invention is also directed to a jump starter device with a current sharing switch (i.e. power switch) arrangement, and safety switch, system, and method. For example, the power or safety switch (e.g. smart switch) of the jump starter comprises a primary current pathway and one or more secondary bypass current pathways to provide the safety switch with one or more bypass current pathways to protect the primary current pathway through the safety switch from current overload damage (e.g. welding contacts of safety switch).

BACKGROUND

There exists jump starters for jump starting vehicles and air compressors for generating compressed air for providing an air supply for tools, equipment, cleaning device, and inflating devices such as tires, inner tubes, inflatable floating device, etc.

Many existing air compressors comprise an electrical cord and plug for connecting the air compressor to a 110-115V AC electrical wall outlet for powering the air compressors.

There exists a need for a portable jump starter and air compressor device, a portable jump starter and air compressor and vacuum cleaner device, and a portable air compressor and vacuum cleaner device, Further, there exists a number of jump starters for charging or boosting a depleted or discharged battery (e.g. vehicle battery) using a rechargeable battery.

High current is required to jump start a depleted or discharged battery (e.g. vehicle battery). Typically, the larger the vehicle, the higher the current. Cold weather makes the problem even worse because the mechanical parts of the starter and engine are harder to move in cold conditions. A problem arises in how to deliver high current to the vehicle battery and starter. Lithium batteries are increasing in power delivery to the point that they can damage the conductors and switching devices, if not designed properly.

In order to provide safety in a jump starter, a safety switch must be provided in the design. This safety switch when open does not allow power to be transferred to the jump starter clamps connected to a depleted or discharged battery. When the safety switch is closed, power required to jump start the vehicle is provided. The safety switch is typically either a relay or FET design.

The advantage of a relay is it is very durable. The disadvantage is the contacts can stick and it is relatively slow when opening or closing. The other disadvantage is it typically takes up a lot of space.

The advantages of FET's are they are small, and they switch on and off very quickly. The disadvantages are they tend to be more fragile (e.g. thermal runaway and load sharing are critical).

The present invention also relates generally to apparatus for jump-starting a vehicle having a depleted or discharged battery. Prior art devices are known, which provide either a pair of electrical connector cables that connect a fully-charged battery of another vehicle to the engine start circuit of the dead battery vehicle, or portable booster devices which include a fully-charged battery which can be connected in circuit with the vehicle's engine starter through a pair of cables.

Problems with the prior art arose when either the jumper terminals or clamps of the cables were inadvertently brought into contact with each other while the other ends were connected to a charged battery, or when the positive and negative terminals were connected to the opposite polarity terminals in the vehicle to be jumped, thereby causing a short circuit resulting in sparking and potential damage to batteries and/or bodily injury.

Various attempts to eliminate these problems have been made in the prior art. U.S. Pat. No. 6,212,054 issued Apr. 3, 2001, discloses a battery booster pack that is polarity sensitive and can detect proper and improper connections before providing a path for electric current flow. The device uses a set of LEDs connected to optical couplers oriented by a control circuit. The control circuit controls a solenoid assembly controlling the path of power current. The control circuit causes power current to flow through the solenoid assembly only if the points of contact of booster cable clamp connections have been properly made.

U.S. Pat. No. 6,632,103 issued Oct. 14, 2003, discloses an adaptive booster cable connected with two pairs of clips, wherein the two pairs of clips are respectively attached to two batteries to transmit power from one battery to the other battery. The adaptive booster cable includes a polarity detecting unit connected to each clip, a switching unit and a current detecting unit both provided between the two pairs of clips. After the polarity of each clip is sensed by the polarity detecting unit, the switching unit generates a proper connection between the two batteries. Therefore, the positive and negative terminals of the two batteries are correctly connected based on the detected result of the polarity detecting unit.

U.S. Pat. No. 8,493,021 issued Jul. 23, 2013, discloses apparatus that monitors the voltage of the battery of a vehicle to be jump started and the current delivered by the jump starter batteries to determine if a proper connection has been established and to provide fault monitoring. Only if the proper polarity is detected can the system operate. The voltage is monitored to determine open circuit, disconnected conductive clamps, shunt cable fault, and solenoid fault conditions. The current through the shunt cable is monitored to determine if there is a battery explosion risk, and for excessive current conditions presenting an overheating condition, which may result in fire. The system includes an internal battery to provide the power to the battery of the vehicle to be jump started. Once the vehicle is started, the unit automatically electrically disconnects from the vehicle's battery.

U.S. Pat. No. 5,189,359 issued Feb. 23, 1993, discloses a jumper cable device having two bridge rectifiers for developing a reference voltage, a four-input decoder for determining which terminals are to be connected based on a comparison of the voltage at each of the four terminals to the reference voltage, and a pair of relays for effecting the correct connection depending on the determination of the decoder. No connection will be made unless only one terminal of each battery has a higher voltage than the reference voltage, indicating "positive" terminals, and one has a lower voltage than the reference voltage, indicating "negative" terminals, and that, therefore, the two high voltage terminals may be connected and the two lower voltage terminals may be connected. Current flows once the appropriate relay device is closed. The relay device is preferably a MOSFET combined with a series array of photodiodes that develop MOSFET gate-closing potential when the decoder output causes an LED to light.

U.S. Pat. No. 5,795,182 issued Aug. 18, 1998, discloses a polarity independent set of battery jumper cables for jumping a first battery to a second battery. The apparatus includes a relative polarity detector for detecting whether two batteries are configured cross or parallel. A three-position high current capacity crossbar pivot switch is responsive to the relative polarity detector for automatically connecting the plus terminals of the two batteries together and the minus terminals of the two batteries together regardless of whether the configuration detected is cross or parallel, and an undercurrent detector and a delay circuit for returning the device to its ready and unconnected state after the device has been disconnected from one of the batteries. The crossbar pivot switch includes two pairs of contacts, and a pivot arm that pivots about two separate points to ensure full electrical contact between the pairs of contacts. The invention can also be used to produce a battery charger that may be connected to a battery without regard to the polarity of the battery.

U.S. Pat. No. 6,262,492 issued Jul. 17, 2001, discloses a car battery jumper cable for accurately coupling an effective power source to a failed or not charged battery, which includes a relay switching circuit connected to the power source and the battery by two current conductor pairs. First and second voltage polarity recognition circuits are respectively connected to the power source and the battery by a respective voltage conductor pair to recognize the polarity of the power source and the battery. A logic recognition circuit produces a control signal subject to the polarity of the power source and the battery, and a driving circuit controlled by the control signal from the logic recognition circuit drives the relay switching circuit, enabling the two poles of the power source to be accurately coupled to the two poles of the battery.

U.S. Pat. No. 5,635,817 issued Jun. 3, 1997, discloses a vehicle battery charging device that includes a control housing having cables including a current limiting device to prevent exceeding of a predetermined maximum charging current of about 40 to 60 amps. The control housing includes a polarity detecting device to verify the correct polarity of the connection of the terminals of the two batteries and to electrically disconnect the two batteries if there is an incorrect polarity.

U.S. Pat. No. 8,199,024 issued Jun. 12, 2012, discloses a safety circuit in a low-voltage connecting system that leaves the two low-voltage systems disconnected until it determines that it is safe to make a connection. When the safety circuit determines that no unsafe conditions exist and that it is safe to connect the two low-voltage systems, the safety circuit may connect the two systems by way of a "soft start" that provides a connection between the two systems over a period of time that reduces or prevents inductive voltage spikes on one or more of the low-voltage systems. When one of the low-voltage systems has a completely-discharged battery incorporated into it, a method is used for detection of proper polarity of the connections between the low-voltage systems. The polarity of the discharged battery is determined by passing one or more test currents through it and determining whether a corresponding voltage rise is observed.

U.S. Pat. No. 5,793,185 issued Aug. 11, 1998, discloses a hand-held jump starter having control components and circuits to prevent overcharging and incorrect connection to batteries.

While the prior art attempted solutions to the abovementioned problems as discussed above, each of the prior art solutions suffers from other shortcomings, either in complexity, cost or potential for malfunction. Accordingly, there exists a need in the art for further improvements to vehicle jump start devices.

SUMMARY

The present invention is directed to a portable jump starter device, an air compressor device, a portable jump starter and air compressor device, a portable jump starter with air compressor device, a portable air compressor and jump starter device, a portable air compressor with jump starter, a portable air compressor with a jump starter and vacuum cleaner device, a portable air compressor and jump starter and vacuum cleaner device, a portable vacuum cleaner device, and a portable jump starter device. For example, the present invention is directed to a portable device comprising a jump starter, air compressor, and/or vacuum in any combination or arrangement.

The present invention is directed to a portable air compressor, for example, comprising a rechargeable Li-ion battery for powering the portable air compressor. The present invention is also directed to a portable air compressor device comprising an air compressor and a jump starter, for example, comprising a rechargeable Li-ion battery for powering the portable air compressor and/or jump starter. The present invention is in addition directed to a portable air compressor device comprising an air compressor, a jump starter, and a vacuum cleaner.

The portable air compressor and the portable jump starter with air compressor can be similar in construction. For example, the portable jump starter with air compressor according to the present invention can comprises the portable air compressor according to the present invention along with additional features (e.g. components and parts) for also providing the jump starter (e.g. jump starter components and parts are added to the air compressor).

The present invention is directed to an improved jump starter device.

The present invention is directed to an improved jump starter configured to provide battery detection and safety.

The present invention is directed to a jump starter configured to provide battery detection and safety, including car battery detection and active car battery detection.

Portable Jump Starter and Air Compressor Device

The presently described subject matter is directed to a portable jump starter and air compressor device, comprising: one or more rechargeable batteries; a jump starter connected to and powered by the one or more rechargeable batteries; and an air compressor, comprising: an electrical motor connected to and powered by the one or more rechargeable batteries; an air compressor unit connected to and driven by the electrical motor, the air compressor comprising a piston/valve arrangement operating within a cylinder of the air compressor, the piston/valve arrangement configured to allow a piston of the piston/valve arrangement to move in close proximity to a cylinder head of the cylinder of the air compressor.

The presently described subject matter is directed to the jump starter being connected to and powered by one of the one or more rechargeable batteries, and the electric motor is connected to and powered by another of the one or more rechargeable batteries.

The presently described subject matter is directed to the air compressor and jump starter being powered by a same of the one or more rechargeable batteries.

The presently described subject matter is directed to the air compressor and jump starter being power by different of the one or more rechargeable batteries.

The presently described subject matter is directed to the air compressor being powered by multiple of the one or more rechargeable batteries.

The presently described subject matter is directed the air compressor and jump starter being powered by multiple of the one or more rechargeable batteries.

The presently described subject matter is directed to a portable jump starter and air compressor device, further comprising a vacuum cleaner.

The presently described subject matter is directed to a portable jump starter and jump starter device comprising a piston of the piston/valve arrangement comprising one or more through holes for accommodating air flow through the piston during movement of the piston.

The presently described subject matter is directed to a portable jump starter and jump starter device comprising a cooling fan for cooling the portable jump starter and air compressor device.

The presently described subject matter is directed to a portable jump starter and jump starter device comprising a cover enclosing the jump starter, the one or more rechargeable batteries, the electrical motor, and the air compressor, the cooling fan configured to cool an interior of the cover or body.

The presently described subject matter is directed to a portable jump starter and jump starter device comprising one or more rechargeable batteries provided with one or more heat sinks.

The presently described subject matter is directed to a portable jump starter and jump starter device comprising one or more rechargeable batteries each comprise an outer cover containing one or more rechargeable battery cells.

The presently described subject matter is directed to a portable jump starter and jump starter device comprising one or more rechargeable batteries each comprise one or more hinged heat sinks.

The presently described subject matter is directed to a portable jump starter and jump starter device comprising one or more rechargeable batteries each comprising a foam layer or foam pad located between the heat sinks and the outer cover.

The presently described subject matter is directed to a portable jump starter and jump starter device comprising a pass-through cable removably connected to the jump starter and air compressor device.

The presently described subject matter is directed to a portable jump starter and jump starter device comprising an electrical port for cooperating with the pass-through cable.

The presently described subject matter is directed to a portable jump starter and jump starter device comprising an electrical port comprising a switch for selecting a mode of operation.

The presently described subject matter is directed to a portable jump starter and jump starter device comprising an electrical port comprising a third pin for electrically connecting the portable jump starter and air compressor device and a charging cable for selecting the mode of operation.

The presently described subject matter is directed to a portable jump starter and jump starter device comprising a piston/valve comprising a rubber seal.

The presently described subject matter is directed to a portable jump starter and jump starter device, wherein the jump starter, the air compressor and vacuum cleaner are powered by a same of the one or more rechargeable batteries.

The presently described subject matter is directed to a portable jump starter and jump starter device, wherein the portable jump starter and air compressor device is configured so that power to the jump starter and air compressor is selectable.

The presently described subject matter is directed to a portable jump starter and jump starter device, further comprising a vacuum cleaner, wherein the portable jump starter and air compressor device is configured so that power to the air compressor, jump starter, and vacuum cleaner is selectable.

The presently described subject matter is directed to a portable jump starter and jump starter device further comprising one or more selectable power switches.

The presently described subject matter is directed to a portable jump starter and jump starter device further comprising an input USB port.

The presently described subject matter is directed to a portable jump starter and jump starter device, wherein the input USB port comprises an input USB connector connect to a USB charge circuit, the USB charge circuit electrically connecting the input USB connector to the rechargeable battery.

The presently described subject matter is directed to a portable jump starter and jump starter device, wherein the USB charge circuit is configured to increase the voltage from the input USB connector to the rechargeable battery.

The presently described subject matter is directed to a portable jump starter and jump starter device, wherein the USB charge circuit comprises a DC to DC converter configured to increase the voltage from the input USB connector to the rechargeable battery.

The presently described subject matter is directed to a portable jump starter and jump starter device comprising an input USB port configured to charge the rechargeable battery, and an output USB port configured to charge one or more external electrical devices using the rechargeable battery.

The presently described subject matter is directed to a portable jump starter and jump starter device comprising a control system or circuit electrically connected to and controlling the power switch, the control system or circuit configured to detect both presence and polarity of the depleted or discharged battery when electrically connected between the positive and negative battery terminal connectors.

Safety Switch

The present invention is also directed to a jump starter having a safety switch (i.e. power switch), and also directed to a particular safety switch for a jump starter. The safety switch comprises a first current pathway in combination with one or more additional current pathways (e.g. one or more additional bypass current pathways) to share the current passing through the switch, for example, to protect at least the first current pathway through the switch.

For example, the safety switch can comprise a primary relay in parallel with a secondary bypass relay. Alternatively, the safety switch can comprise a primary relay in parallel with a secondary bypass FET or FETs. As a further alternative, the safety switch can comprise a primary FET or FETs in parallel with a secondary bypass relay.

The combination of using both a relay and FET (e.g. relay, relays, FET, FETs) in the switch construction can take advantage and concentrate the strengths of using both at least one relay and at least one FET while helping to eliminate the weaknesses of both using only a relay or FET. At least one FET can be added in parallel with at least one relay to help share current and help minimize the space required by a larger relay. The at least one can be switched on and off whenever needed, and can also be pulse width modulated (PMW) to control how much current gets shared.

The primary and secondary current pathways (e.g. relay, relays, FET, FETs, or combinations thereof) can equally share the amount of current passing through each device arranged in parallel. However, the switch can be arranged, for example, so that the primary current pathway handles or accommodates more or most of the current and the secondary currently pathway handles or accommodates less or least of the current passing through the switch (e.g. smart switch) when activated or opened.

For example, the primary current pathway is configured to handle or accommodate eighty to eighty-five percent (i.e. 80-85%) of the total current passing through the switch when activated or opened, and the secondary current pathway is configured to handle or accommodate ten to fifteen percent (i.e. 10-15%) of the total current passing through the switch when activated or opened.

Relay/FET Conductor

A conductor (e.g. a heavier gauge conductor, copper conductor, aluminum conductor, bus bar) can connect the exit ends of the at least one relay and the at least one FET. The conductor can be sized or rated to control the amount of current that flows through each of the at least one relay and at least one FET. Again, the conductor can be copper, aluminum, or some other conductive or highly conductive metal, and can be made (e.g. stamped, formed, cut, machined) into shape for optimal connection between the at least one relay and the at least one FET.

The presently described subject matter is directed to an improved jump starter.

The presently described subject matter is directed to a jump starter comprising an improved switch (i.e. power switch) for a jump starter.

The presently described subject matter is directed to an improved jump starter power switch.

The presently described subject matter is directed to a jump starting apparatus for charging or jumping a depleted or discharged battery, the jump starting apparatus comprising: a rechargeable battery; a power switch comprising one or more primary switches and one or more secondary switches; a positive battery cable connected to the rechargeable battery; and a negative battery cable connected to the power switch.

The presently described subject matter is directed to a jump starting apparatus for charging or jumping a depleted or discharged battery, the jump starting apparatus comprising: a rechargeable battery; a power switch comprising one or more primary switches and one or more secondary switches; a positive battery cable connected to the rechargeable battery; and a negative battery cable connected to the power switch, wherein the rechargeable battery is a lithium ion rechargeable battery.

The presently described subject matter is directed to a jump starting apparatus for charging or jumping a depleted or discharged battery, the jump starting apparatus comprising: a rechargeable battery; a power switch comprising one or more primary switches and one or more secondary switches; a positive battery cable connected to the rechargeable battery; and a negative battery cable connected to the power switch, wherein the one or more primary switches and one or more secondary switches accommodate a same amount of current during charging operation of the jump starting apparatus.

The presently described subject matter is directed to a jump starting apparatus for charging or jumping a depleted or discharged battery, the jump starting apparatus comprising: a rechargeable battery; a power switch comprising one or more primary switches and one or more secondary switches; a positive battery cable connected to the rechargeable battery; and a negative battery cable connected to the power switch, wherein the one or more primary switches accommodates more current than the one or more secondary switches during charging operation of the jump starting apparatus.

The presently described subject matter is directed to a jump starting apparatus for charging or jumping a depleted or discharged battery, the jump starting apparatus comprising: a rechargeable battery; a power switch comprising one or more primary switches and one or more secondary switches; a positive battery cable connected to the rechargeable battery; and a negative battery cable connected to the power switch, wherein the one or more primary switches accommodates more current than the one or more secondary switches during charging operation of the jump starting apparatus, wherein the one or more secondary switches is one or more bypass switches.

The presently described subject matter is directed to a jump starting apparatus for charging or jumping a depleted or discharged battery, the jump starting apparatus comprising: a rechargeable battery; a power switch comprising one or more primary switches and one or more secondary switches; a positive battery cable connected to the rechargeable battery; and a negative battery cable connected to the power switch. 6, wherein the power switch is a smart switch controlled by a microcontroller.

The presently described subject matter is directed to a jump starting apparatus for charging or jumping a depleted or discharged battery, the jump starting apparatus comprising: a rechargeable battery; a power switch comprising one or more primary switches and one or more secondary switches; a positive battery cable connected to the rechargeable battery; and a negative battery cable connected to the power switch, wherein the power switch is a smart switch controlled by a microcontroller, wherein the smart switch is configured to first turn on the one or more primary switched and then turn on the one or more secondary switches is a sequence.

The presently described subject matter is directed to a jump starting apparatus for charging or jumping a depleted or discharged battery, the jump starting apparatus comprising: a rechargeable battery; a power switch comprising one or more primary switches and one or more secondary switches; a positive battery cable connected to the rechargeable battery; and a negative battery cable connected to the power switch, wherein the power switch is a smart switch controlled by a microcontroller, wherein the smart switch is configured to first turn on the one or more primary switched and then turn on the one or more secondary switches is a sequence, wherein the one or more secondary switches are turned on after a one-hundred millisecond delay.

The presently described subject matter is directed to a jump starting apparatus for charging or jumping a depleted or discharged battery, the jump starting apparatus comprising: a rechargeable battery; a power switch comprising one or more primary switches and one or more secondary switches; a positive battery cable connected to the rechargeable battery; and a negative battery cable connected to the power switch, wherein the one or more primary switches accommodates more current than the one or more secondary switches during charging operation of the jump starting apparatus, wherein the one or more primary switches are one or more relays and the one or more secondary switches are one or more FETs.

The presently described subject matter is directed to a jump starting apparatus for charging or jumping a depleted or discharged battery, the jump starting apparatus comprising: a rechargeable battery; a power switch comprising one or more primary switches and one or more secondary switches; a positive battery cable connected to the rechargeable battery; and a negative battery cable connected to the power switch, wherein the one or more primary switches accommodates more current than the one or more secondary switches during charging operation of the jump starting apparatus, wherein the one or more primary switches are one or more FETS and the one or more secondary switches are one or more relays.

The presently described subject matter is directed to a jump starting apparatus for charging or jumping a depleted or discharged battery, the jump starting apparatus comprising: a rechargeable battery; a power switch comprising one or more primary switches and one or more secondary switches; a positive battery cable connected to the rechargeable battery; and a negative battery cable connected to the power switch, further comprising a conductor connected to output ends of the one or more primary switches and the one or more secondary switches.

The presently described subject matter is directed to a jump starting apparatus for charging or jumping a depleted or discharged battery, the jump starting apparatus comprising: a rechargeable battery; a power switch comprising one or more primary switches and one or more secondary switches; a positive battery cable connected to the rechargeable battery; and a negative battery cable connected to the power switch, further comprising a conductor connected to output ends of the one or more primary switches and the one or more secondary switches, wherein the conductor is a heavy gauge conductor configured to accommodate a substantial amount of charging current without being damaged.

The presently described subject matter is directed to a jump starting apparatus for charging or jumping a depleted or discharged battery, the jump starting apparatus comprising: a rechargeable battery; a power switch comprising one or more primary switches and one or more secondary switches; a positive battery cable connected to the rechargeable battery; and a negative battery cable connected to the power switch, further comprising a conductor connected to output ends of the one or more primary switches and the one or more secondary switches, wherein the conductor is a heavy gauge conductor configured to accommodate a substantial amount of charging current without being damaged, wherein the heavy gauge conductor is made of conductive metal.

The presently described subject matter is directed to a jump starting apparatus for charging or jumping a depleted or discharged battery, the jump starting apparatus comprising: a rechargeable battery; a power switch comprising one or more primary switches and one or more secondary switches; a positive battery cable connected to the rechargeable battery; and a negative battery cable connected to the power switch, further comprising a conductor connected to output ends of the one or more primary switches and the one or more secondary switches, wherein the conductor is a heavy gauge conductor configured to accommodate a substantial amount of charging current without being damaged, wherein the heavy gauge conductor is made of conductive metal, wherein the heavy gauge conductor is a plate, bar, rod, tube, or bus bar.

The presently described subject matter is direct to a jump starting apparatus having a current sharing arrangement for charging or jumping a depleted or discharged battery, the jump starting apparatus comprising: a rechargeable battery; a power switch configured to turn on or off power from the rechargeable battery to the depleted or discharged battery, the power switch comprising one or more primary switches and one or more secondary switches connected together in an electrical parallel arrangement; a positive battery cable connected to the rechargeable battery, the positive battery cable having a positive battery terminal connector for connecting to a positive terminal of the depleted or discharged battery; and a negative battery cable connected to the power switch, the negative battery cable having a negative battery terminal connector for connecting to a negative terminal of the depleted or discharged battery, wherein the power switch is connected in circuit with the rechargeable battery to turn power on from the rechargeable battery to the depleted or discharged battery during charging operation of the jump starting apparatus, wherein the power switch is a smart switch controlled by a microcontroller, wherein the smart switch is configured to turn on or close the one or more primary switches and then turn on or close the one or more secondary switches in a sequence, and wherein the smart switch is configured to first turn off or open the one or more secondary switches and then turn off or open the one or more primary switches in a sequence.

The presently described subject matter is direct to a jump starting apparatus having a current sharing arrangement for charging or jumping a depleted or discharged battery, the jump starting apparatus comprising: a rechargeable battery; a power switch configured to turn on or off power from the rechargeable battery to the depleted or discharged battery, the power switch comprising one or more primary switches and one or more secondary switches connected together in an electrical parallel arrangement; a positive battery cable connected to the rechargeable battery, the positive battery cable having a positive battery terminal connector for connecting to a positive terminal of the depleted or discharged battery; and a negative battery cable connected to the power switch, the negative battery cable having a negative battery terminal connector for connecting to a negative terminal of the depleted or discharged battery, wherein the power switch is connected in circuit with the rechargeable battery to turn power on from the rechargeable battery to the depleted or discharged battery during charging operation of the jump starting apparatus, wherein the power switch is a smart switch controlled by a microcontroller, wherein the smart switch is configured to turn on or close the one or more primary switches and then turn on or close the one or more secondary switches in a sequence, wherein the smart switch is configured to first turn off or open the one or more secondary switches and then turn off or open the one or more primary switches in a sequence, and wherein the one or more secondary switches are one or more bypass switches accommodating less current than the one or more primary switches.

The presently described subject matter is direct to a jump starter power switch for connecting power from a rechargeable battery to a depleted or discharged batter, the power switch comprising: one or more primary switches and one or more secondary switches connected together in an electrical parallel arrangement.

The presently described subject matter is directed to a jump starting apparatus having a current sharing arrangement for charging or jumping a depleted or discharged battery, the jump starting apparatus comprising: a rechargeable battery; a power switch configured to turn on or off power from the rechargeable battery to the depleted or discharged battery, the power switch comprising one or more primary switches and one or more secondary switches connected together in an electrical parallel arrangement; a positive battery cable connected to the rechargeable battery, the positive battery cable having a positive battery terminal connector for connecting to a positive terminal of the depleted or discharged battery; and a negative battery cable connected to the power switch, the negative battery cable having a negative battery terminal connector for connecting to a negative terminal of the depleted or discharged battery, wherein the power switch is connected in circuit with the rechargeable battery to turn power on from the rechargeable battery to the depleted or discharged battery during charging operation of the jump starting apparatus, further comprising a USB charge circuit electrically connecting the input USB connector to the rechargeable battery.

The presently described subject matter is directed to a jump starting apparatus having a current sharing arrangement for charging or jumping a depleted or discharged battery, the jump starting apparatus comprising: a rechargeable battery; a power switch configured to turn on or off power from the rechargeable battery to the depleted or discharged battery, the power switch comprising one or more primary switches and one or more secondary switches connected together in an electrical parallel arrangement; a positive battery cable connected to the rechargeable battery, the positive battery cable having a positive battery terminal connector for connecting to a positive terminal of the depleted or discharged battery; and a negative battery cable connected to the power switch, the negative battery cable having a negative battery terminal connector for connecting to a negative terminal of the depleted or discharged battery, wherein the power switch is connected in circuit with the rechargeable battery to turn power on from the rechargeable battery to the depleted or discharged battery during charging operation of the jump starting apparatus, further comprising a USB charge circuit electrically connecting the input USB connector to the rechargeable battery, the USB charge circuit configured to increase voltage between the USB connector and the rechargeable battery.

The presently described subject matter is directed to a jump starting apparatus having a current sharing arrangement for charging or jumping a depleted or discharged battery, the jump starting apparatus comprising: a rechargeable battery; a power switch configured to turn on or off power from the rechargeable battery to the depleted or discharged battery, the power switch comprising one or more primary switches and one or more secondary switches connected together in an electrical parallel arrangement; a positive battery cable connected to the rechargeable battery, the positive battery cable having a positive battery terminal connector for connecting to a positive terminal of the depleted or discharged battery; and a negative battery cable connected to the power switch, the negative battery cable having a negative battery terminal connector for connecting to a negative terminal of the depleted or discharged battery, wherein the power switch is connected in circuit with the rechargeable battery to turn power on from the rechargeable battery to the depleted or discharged battery during charging operation of the jump starting apparatus, further comprising a USB charge circuit electrically connecting the input USB connector to the rechargeable battery, the USB charge circuit comprising a DC to DC converter configured to increase voltage between the input USB connector and the rechargeable battery.

The presently described subject matter is directed to a jump starting apparatus having a current sharing arrangement for charging or jumping a depleted or discharged battery, the jump starting apparatus comprising: a rechargeable battery; a power switch configured to turn on or off power from the rechargeable battery to the depleted or discharged battery, the power switch comprising one or more primary switches and one or more secondary switches connected together in an electrical parallel arrangement; a positive battery cable connected to the rechargeable battery, the positive battery cable having a positive battery terminal connector for connecting to a positive terminal of the depleted or discharged battery; and a negative battery cable connected to the power switch, the negative battery cable having a negative battery terminal connector for connecting to a negative terminal of the depleted or discharged battery, wherein the power switch is connected in circuit with the rechargeable battery to turn power on from the rechargeable battery to the depleted or discharged battery during charging operation of the jump starting apparatus, further comprising an input USB connector configured to charge the rechargeable battery, and an output USB connector configured to charge one or more external electrical devices.

The presently described subject matter is directed to a jump starting apparatus having a current sharing arrangement for charging or jumping a depleted or discharged battery, the jump starting apparatus comprising: a rechargeable battery; a power switch configured to turn on or off power from the rechargeable battery to the depleted or discharged battery, the power switch comprising one or more primary switches and one or more secondary switches connected together in an electrical parallel arrangement; a positive battery cable connected to the rechargeable battery, the positive battery cable having a positive battery terminal connector for connecting to a positive terminal of the depleted or discharged battery; and a negative battery cable connected to the power switch, the negative battery cable having a negative battery terminal connector for connecting to a negative terminal of the depleted or discharged battery, wherein the power switch is connected in circuit with the rechargeable battery to turn power on from the rechargeable battery to the depleted or discharged battery during charging operation of the jump starting apparatus, further comprising a control system or circuit electrically connected to and controlling the power switch, the control system or circuit configured to detect both presence and polarity of the depleted or discharged battery when electrically connected between the positive and negative battery terminal connectors.

Safety Features

In accordance with an aspect of the invention, apparatus is provided for jump starting a vehicle engine, including: an internal power supply; an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs; a power FET switch connected between said internal power supply and said output port; and a microcontroller configured to receive input signals from said vehicle isolation sensor and said reverse polarity sensor, and to provide an output signal to said power FET switch, such that said power FET switch is turned on to connect said internal power supply to said output port in response to signals from said sensors indicating the presence of a vehicle battery at said output port and proper polarity connection of positive and negative terminals of said vehicle battery with said positive and negative polarity outputs.

In accordance with another aspect of the invention, the internal power supply is a rechargeable lithium ion battery pack.

In accordance with yet another aspect of the invention, a jumper cable device is provided, having a plug configured to plug into an output port of a handheld battery charger booster device having an internal power supply; a pair of cables integrated with the plug at one respective end thereof; said pair of cables being configured to be separately connected to terminals of a battery at another respective end thereof.

BRIEF DESCRIPTION OF THE DRAWINGS

FIGS. 2A-1-2C-3 are schematic circuit diagrams of an example embodiment of a handheld vehicle battery boost apparatus in accordance with an aspect of the invention.

FIG. 3 is a perspective view of a handheld jump starter booster device in accordance with one example embodiment of the invention.

DETAILED DESCRIPTION

Figure 1:
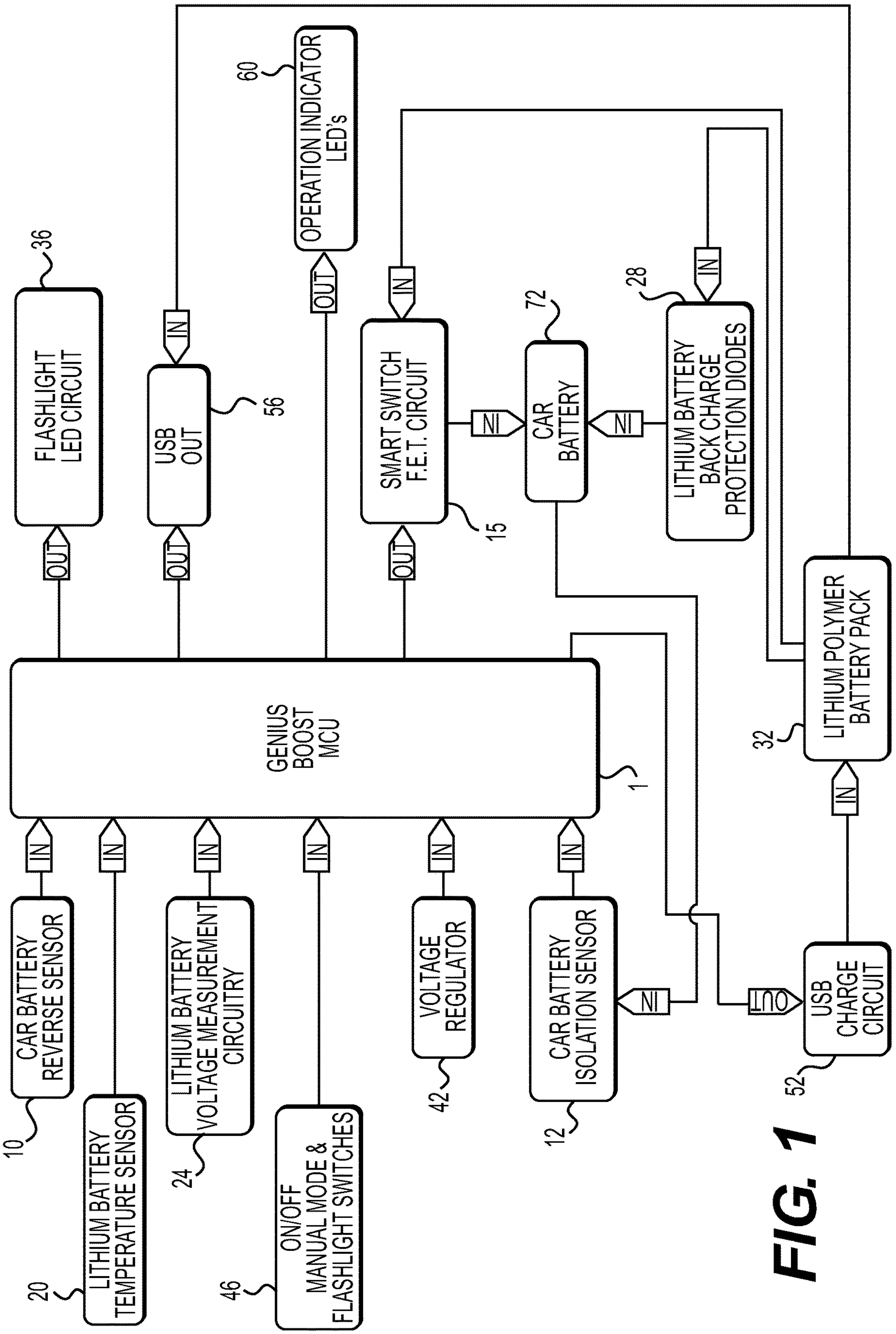
FIG. 1 is a functional block diagram of a handheld vehicle battery boost apparatus in accordance with one aspect of the present invention.

FIG. 1 is a functional block diagram of a handheld battery booster according to one aspect of the invention. At the heart of the handheld battery booster is a lithium polymer battery pack 32, which stores sufficient energy to jump start a vehicle engine served by a conventional 12 volt lead-acid or valve regulated lead-acid battery. In one example embodiment, a high-surge lithium polymer battery pack includes three 3.7V, 2666 mAh lithium polymer batteries in a 351P configuration. The resulting battery pack provides 11.1V, 2666 Ah (8000 Ah at 3.7V, 29.6 Wh). Continuous discharge current is 25 C (or 200 amps), and burst discharge current is 50 C (or 400 amps). The maximum charging current of the battery pack is 8000 mA (8 amps).

A programmable microcontroller unit (MCU) 1 receives various inputs and produces informational as well as control outputs. The programmable MCU 1 further provides flexibility to the system by allowing updates in functionality and system parameters, without requiring any change in hardware. According to one example embodiment, an 8 bit microcontroller with 2K×15 bits of flash memory is used to control the system. One such microcontroller is the HT67F30, which is commercially available from Holtek Semiconductor Inc.

A car battery reverse sensor 10 monitors the polarity of the vehicle battery 72 when the handheld battery booster device is connected to the vehicle's electric system. As explained below, the booster device prevents the lithium battery pack from being connected to the vehicle battery 72 when the terminals of the battery 72 are connected to the wrong terminals of the booster device. A car battery isolation sensor 12 detects whether or not a vehicle battery 72 is connected to the booster device, and prevents the lithium battery pack from being connected to the output terminals of the booster device unless there is a good (e.g. chargeable) battery connected to the output terminals.

A smart switch FET circuit 15 electrically switches the handheld battery booster lithium battery to the vehicle's electric system only when the vehicle battery is determined by the MCU 1 to be present (in response to a detection signal provided by isolation sensor 12) and connected with the correct polarity (in response to a detection signal provided by reverse sensor 10). A lithium battery temperature sensor 20 monitors the temperature of the lithium battery pack 32 to detect overheating due to high ambient temperature conditions and overextended current draw during jump starting. A lithium battery voltage measurement circuit 24 monitors the voltage of the lithium battery pack 32 to prevent the voltage potential from rising too high during a charging operation and from dropping too low during a discharge operation.

Lithium battery back-charge protection diodes 28 prevent any charge current being delivered to the vehicle battery 72 from flowing back to the lithium battery pack 32 from the vehicle's electrical system. Flashlight LED circuit 36 is provided to furnish a flashlight function for enhancing light under a vehicle's hood in dark conditions, as well as providing SOS and strobe lighting functions for safety purposes when a vehicle may be disabled in a potentially dangerous location. Voltage regulator 42 provides regulation of internal operating voltage for the microcontroller and sensors. On/Off manual mode and flashlight switches 46 allow the user to control power-on for the handheld battery booster device, to control manual override operation if the vehicle has no battery, and to control the flashlight function. The manual button functions only when the booster device is powered on. This button allows the user to jump-start vehicles that have either a missing battery, or the battery voltage is so low that automatic detection by the MCU is not possible. When the user presses and holds the manual override button for a predetermined period time (such as three seconds) to prevent inadvertent actuation of the manual mode, the internal lithium ion battery power is switched to the vehicle battery connect port. The only exception to the manual override is if the car battery is connected in reverse. If the car battery is connected in reverse, the internal lithium battery power shall never be switched to the vehicle battery connect port.

USB charge circuit 52 converts power from any USB charger power source, to charge voltage and current for charging the lithium battery pack 32. USB output 56 provides a USB portable charger for charging smartphones, tablets, and other rechargeable electronic devices. Operation indicator LEDs 60 provide visual indication of lithium battery capacity status as well as an indication of smart switch activation status (indicating that power is being provided to the vehicle's electrical system).

Figures 1, 2A:
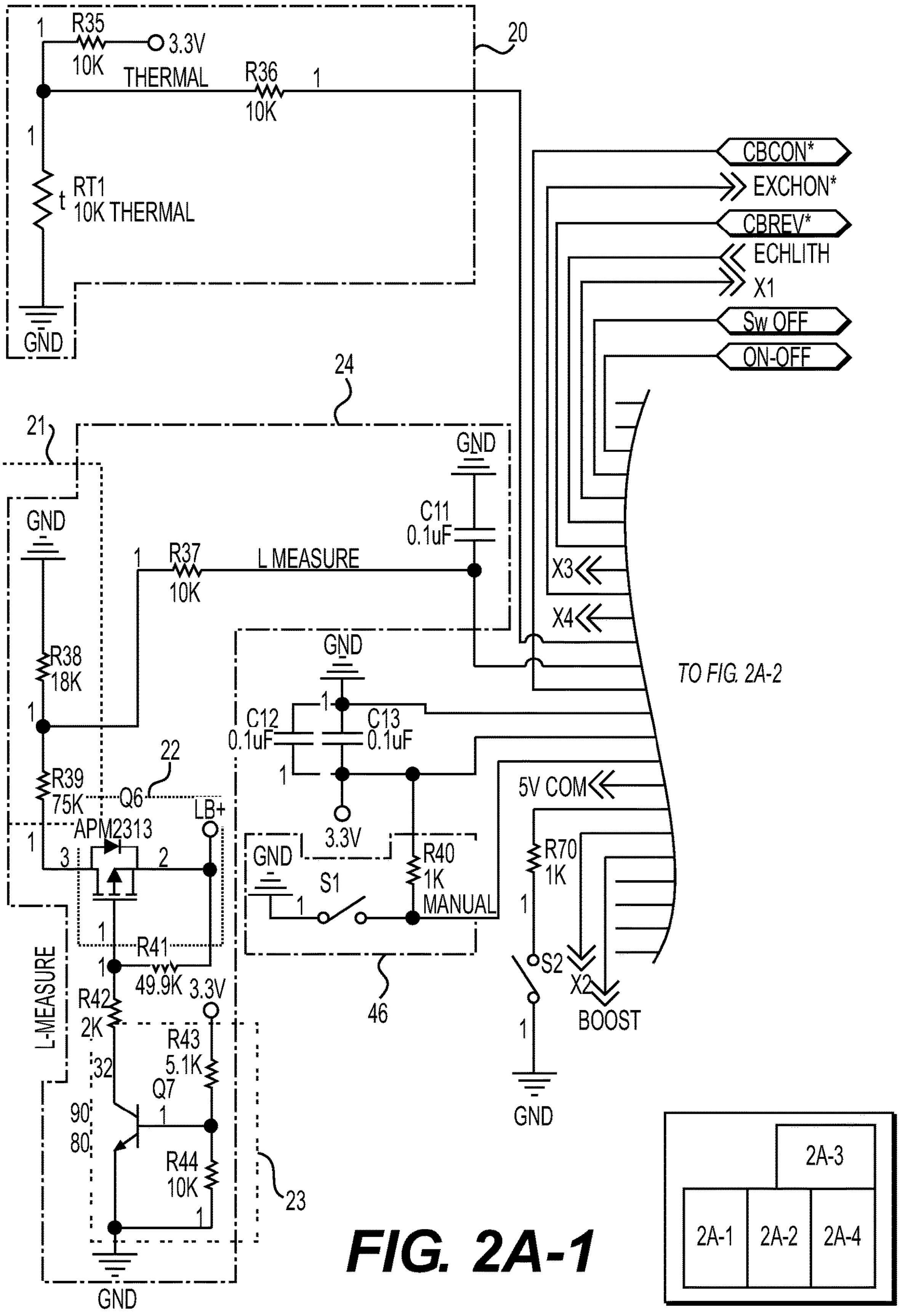
Figures 2, 2A:
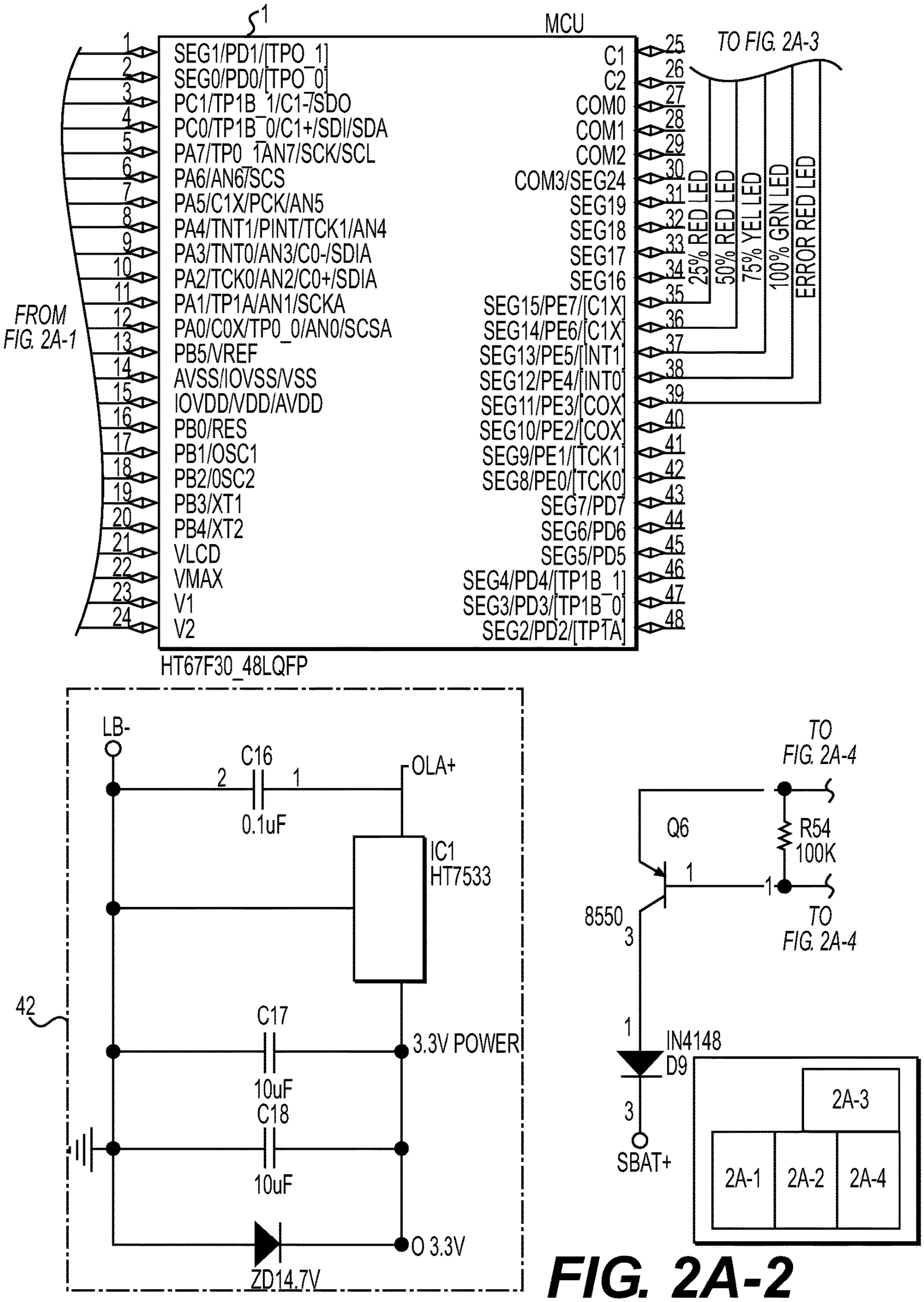

Detailed operation of the handheld booster device will now be described with reference to the schematic diagrams of FIGS. 2A-1-2C-3. As shown in FIG. 2A-2, the microcontroller unit 1 is the center of all inputs and outputs. The reverse battery sensor comprises an optically coupled isolator phototransistor (4N27) connected to the terminals of vehicle battery 72 at input pins 1 and 2 with a diode D8 in the lead conductor of pin 1 (associated with the negative terminal CB−), such that if the battery 72 is connected to the terminals of the booster device with the correct polarity, the optocoupler LED 11 will not conduct current, and is therefore turned off, providing a "1" or high output signal to the MCU 1. The car battery isolation sensor 12 comprises an optically coupled isolator phototransistor (4N27) connected to the terminals of vehicle battery 72 at input pins 1 and 2 with a diode D7 in the lead conductor of pin 1 (associated with the positive terminal CB+), such that if the battery 72 is connected to the terminals of the booster device with the correct polarity, the optocoupler LED 11A will conduct current, and is therefore turned on, providing a "0" or low output signal to the MCU, indicating the presence of a battery across the jumper output terminals of the handheld booster device.

If the car battery 72 is connected to the handheld booster device with reverse polarity, the optocoupler LED 11 of the reverse sensor 10 will conduct current, providing a "0" or low signal to microcontroller unit 1. Further, if no battery is connected to the handheld booster device, the optocoupler LED 11A of the isolation sensor 12 will not conduct current, and is therefore turned off, providing a "1" or high output signal to the MCU, indicating the absence of any battery connected to the handheld booster device. Using these specific inputs, the microcontroller software of MCU 1 can determine when it is safe to turn on the smart switch FET 15, thereby connecting the lithium battery pack to the jumper terminals of the booster device. Consequently, if the car battery 72 either is not connected to the booster device at all, or is connected with reverse polarity, the MCU 1 can keep the smart switch FET 15 from being turned on, thus prevent sparking/short circuiting of the lithium battery pack.

Figures 2, 2A, 3:
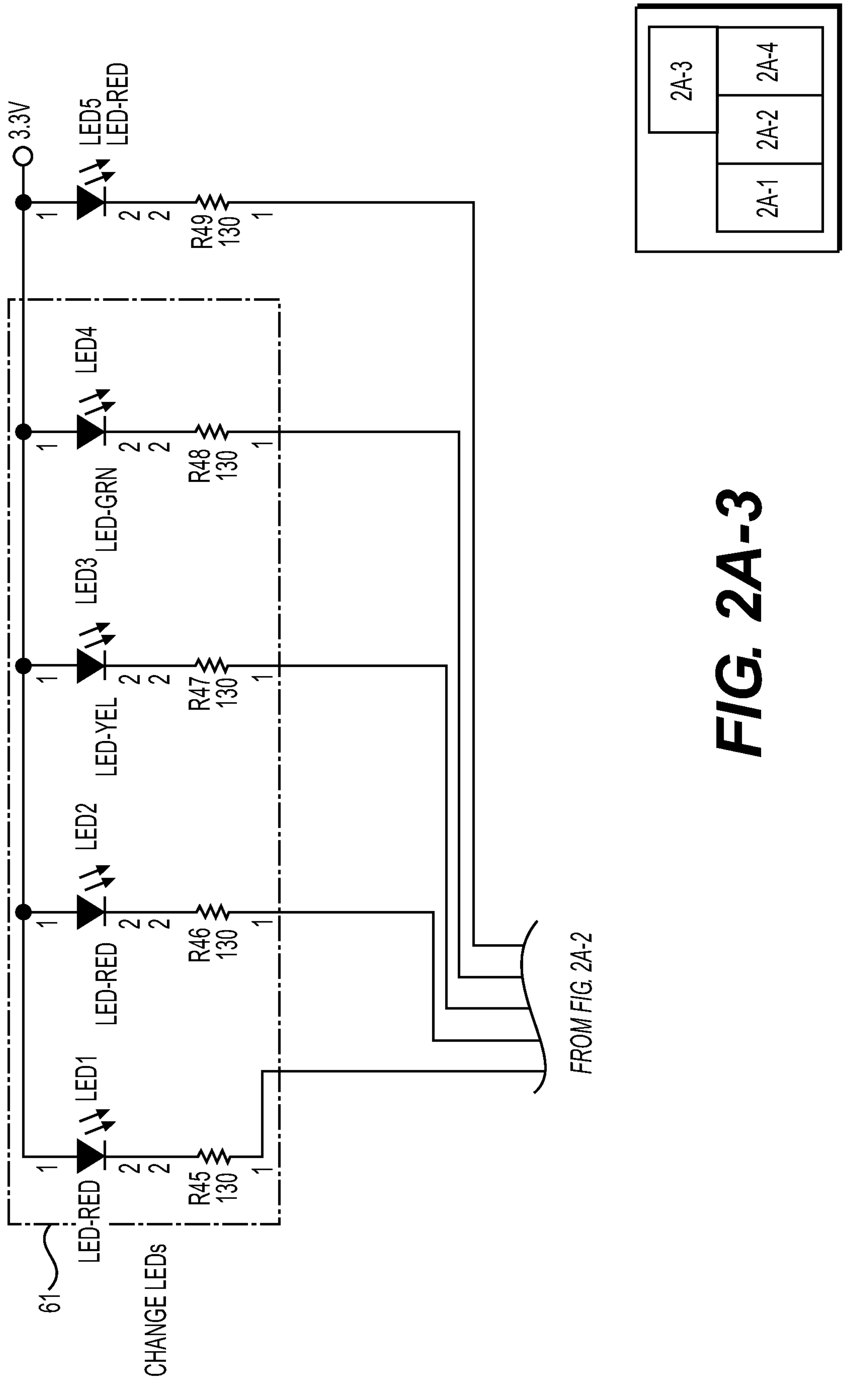
Figures 2, 2A, 3, 4:
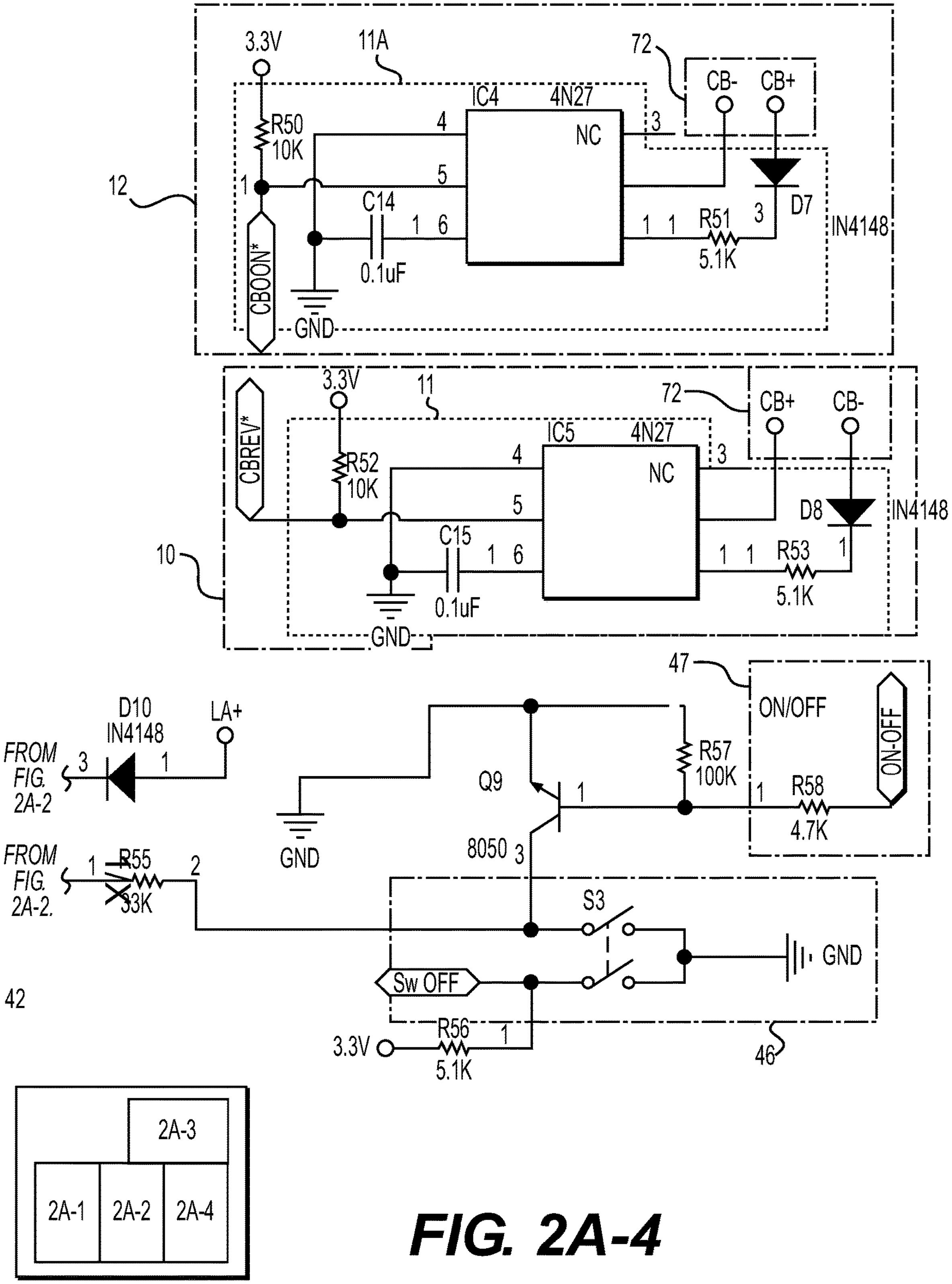
Figures 2, 2B, 3, 4:
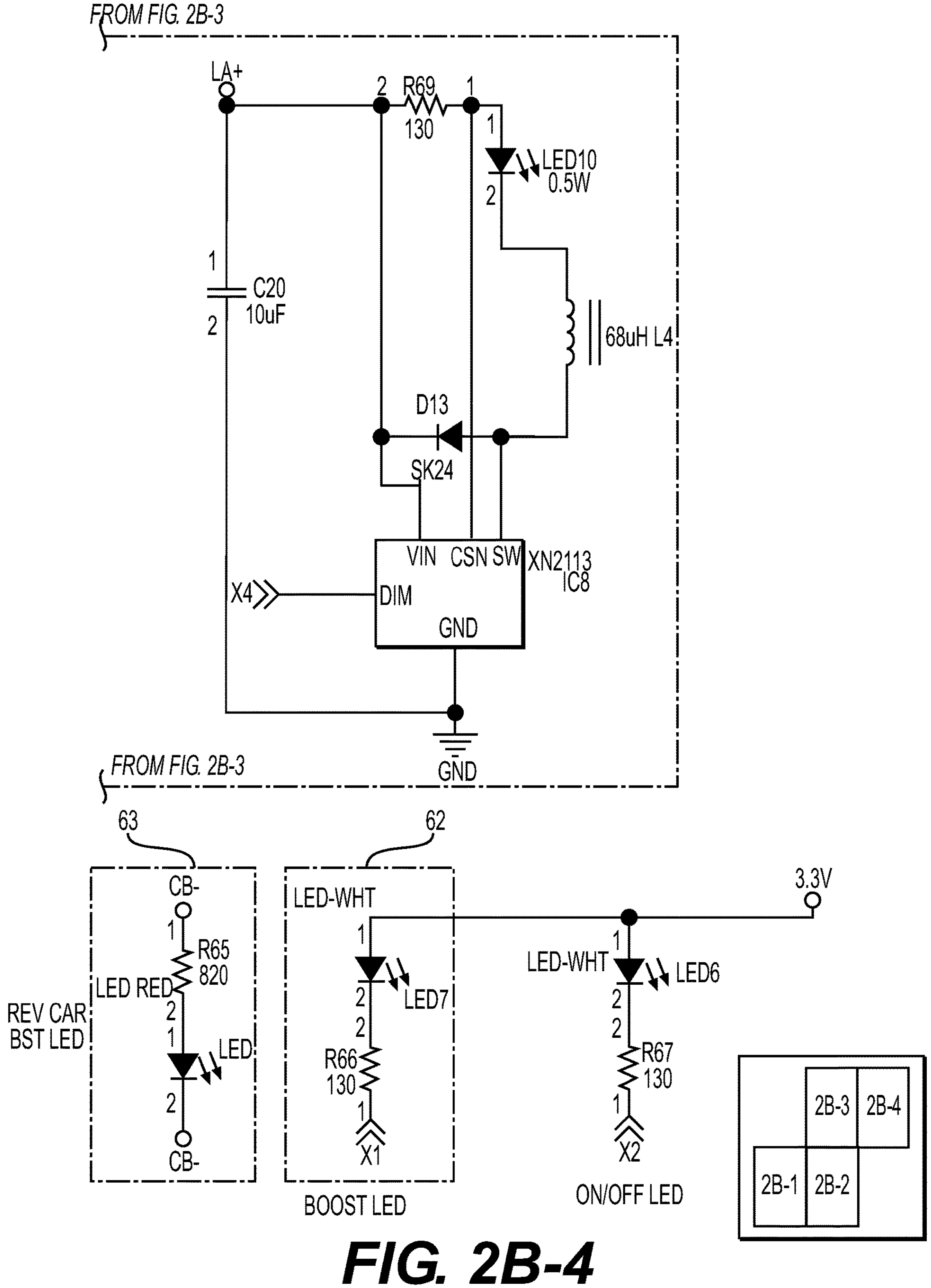
Figure 3:
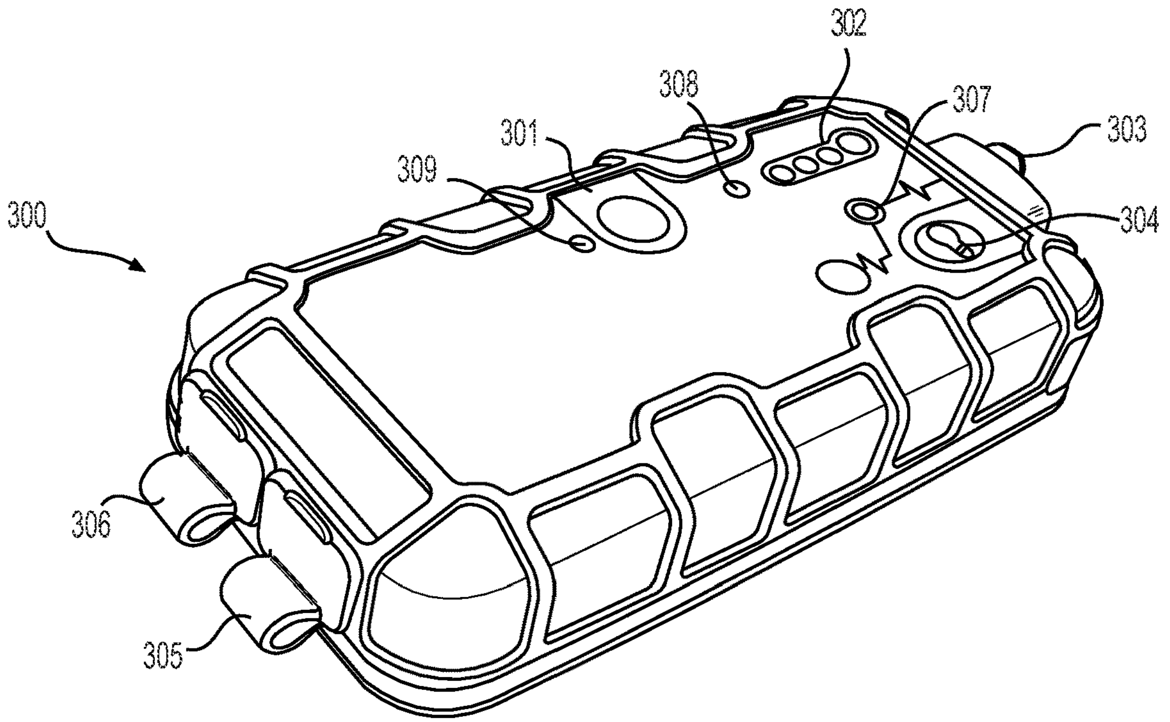
Figure 4:
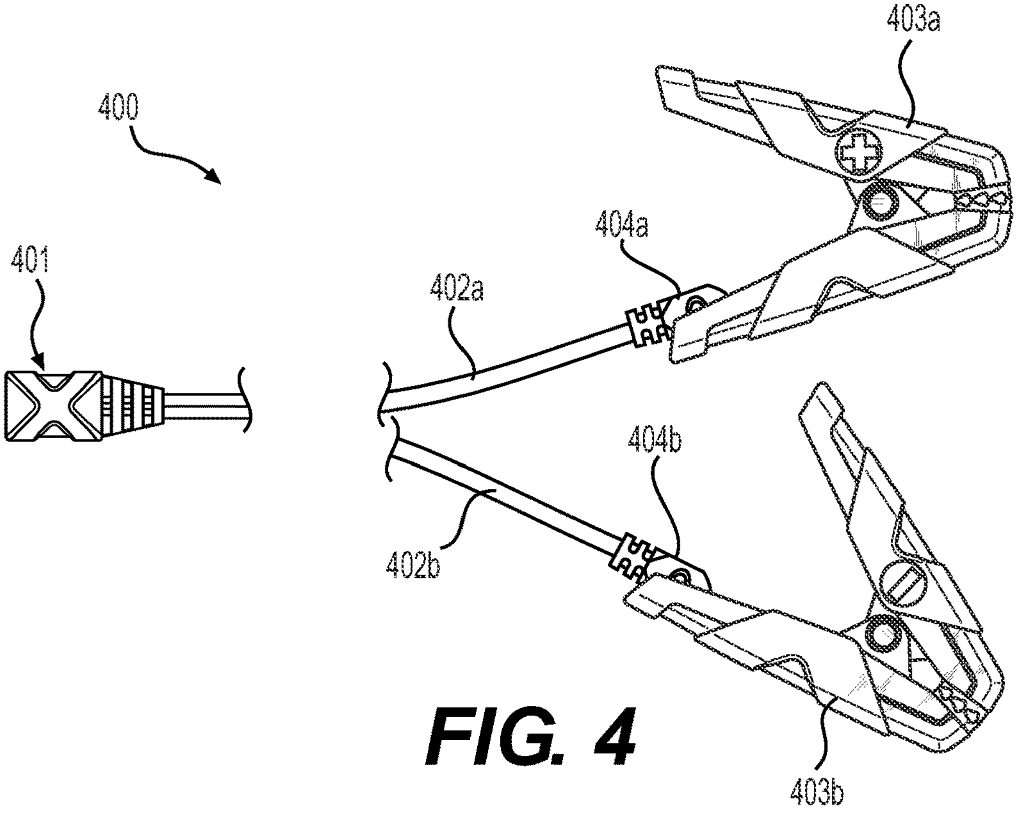
FIG. 4 is a plan view of a jumper cable usable with the handheld jump starter booster device in accordance with another aspect of the invention.

As shown in FIG. 2B-2, the FET smart switch 15 is driven by an output of the microcontroller 1. The FET smart switch 15 includes three FETs (Q15, Q18, and Q19) in parallel, which spreads the distribution of power from the lithium battery pack over the FETs. When that microcontroller output is driven to a logic low, FETs 16 are all in a high resistance state, therefore not allowing current to flow from the internal lithium battery negative contact 17 to the car battery 72 negative contact. When the micro controller output is driven to a logic high, the FETs 16 (Q15, Q18, and Q19) are in a low resistant state, allowing current to flow freely from the internal lithium battery pack negative contact 17 (LB−) to the car battery 72 negative contact (CB−). In this way, the microcontroller software controls the connection of the internal lithium battery pack 32 to the vehicle battery 72 for jumpstarting the car engine.

Referring back to FIG. 2A-1, the internal lithium battery pack voltage can be accurately measured using circuit 24 and one of the analog-to-digital inputs of the microcontroller 1. Circuit 24 is designed to sense when the main 3.3V regulator 42 voltage is on, and to turn on transistor 23 when the voltage of regulator 42 is on. When transistor 23 is conducting, it turns on FET 22, thereby providing positive contact (LB+) of the internal lithium battery a conductive path to voltage divider 21 allowing a lower voltage range to be brought to the microcontroller to be read. Using this input, the microcontroller software can determine if the lithium battery voltage is too low during discharge operation or too high during charge operation, and take appropriate action to prevent damage to electronic components.

Still referring to FIG. 2A-1, the temperature of the internal lithium battery pack 32 can be accurately measured by two negative temperature coefficient (NTC) devices 20. These are devices that reduce their resistance when their temperature rises. The circuit is a voltage divider that brings the result to two analog-to-digital (ND) inputs on the microcontroller 1. The microcontroller software can then determine when the internal lithium battery is too hot to allow jumpstarting, adding safety to the design.

The main voltage regulator circuit 42 is designed to convert internal lithium battery voltage to a regulated 3.3 volts that is utilized by the microcontroller 1 as well as by other components of the booster device for internal operating power. Three lithium battery back charge protection diodes 28 (see FIG. 2B-1) are in place to allow current to flow only from the internal lithium battery pack 32 to the car battery 72, and not from the car battery to the internal lithium battery. In this way, if the car electrical system is charging from its alternator, it cannot back-charge (and thereby damage) the internal lithium battery, providing another level of safety. The main power on switch 46 (FIG. 2A-1) is a combination that allows for double pole, double throw operation so that with one push, the product can be turned on if it is in the off state, or turned off if it is in the on state. This circuit also uses a microcontroller output 47 to "keep alive" the power when it is activated by the on switch. When the switch is pressed the microcontroller turns this output to a high logic level to keep power on when the switch is released. In this way, the microcontroller maintains control of when the power is turned off when the on/off switch is activated again or when the lithium battery voltage is getting too low. The microcontroller software also includes a timer that turns the power off after a predefined period of time, (such as, e.g. 8 hours) if not used.

The flashlight LED circuit 45 shown in FIG. 2B-3 controls the operation of flashlight LEDs. Two outputs from the microcontroller 1 are dedicated to two separate LEDs. Thus, the LEDs can be independently software-controlled for strobe and SOS patterns, providing yet another safety feature to the booster device. LED indicators provide the feedback the operator needs to understand what is happening with the product. Four separate LEDs 61 (FIG. 2A) are controlled by corresponding individual outputs of microcontroller 1 to provide indication of the remaining capacity of the internal lithium battery. These LEDs are controlled in a "fuel gauge" type format with 25%, 50%, 75% and 100% (red, red, yellow, green) capacity indications. An LED indicator 63 (FIG. 2B-4) provides a visual warning to the user when the vehicle battery 72 has been connected in reverse polarity. "Boost" and on/off LEDs 62 provide visual indications when the booster device is provide jump-start power, and when the booster device is turned on, respectively.

A USB output 56 circuit (FIG. 2C-1) is included to provide a USB output for charging portable electronic devices such as smartphones from the internal lithium battery pack 32. Control circuit 57 from the microcontroller 1 allows the USB Out 56 to be turned on and off by software control to prevent the internal lithium battery getting too low in capacity. The USB output is brought to the outside of the device on a standard USB connector 58, which includes the standard voltage divider required for enabling charge to certain smartphones that require it. The USB charge circuit 52 allows the internal lithium battery pack 32 to be charged using a standard USB charger. This charge input uses a standard micro-USB connector 48 allowing standard cables to be used. The 5V potential provided from standard USB chargers is up-converted to the 12.4 VDC voltage required for charging the internal lithium battery pack using a DC-DC converter 49. The DC-DC converter 49 can be turned on and off via circuit 53 by an output from the microcontroller 1.

In this way, the microcontroller software can turn the charge off if the battery voltage is measured to be too high by the ND input 22. Additional safety is provided for helping to eliminate overcharge to the internal lithium battery using a lithium battery charge controller 50 that provides charge balance to the internal lithium battery cells 51. This controller also provides safety redundancy for eliminating over discharge of the internal lithium battery.

FIG. 3 is a perspective view of a handheld device 300 in accordance with an exemplary embodiment of the invention. 301 is a power on switch. 302 shows the LED "fuel gauge" indicators 61. 303 shows a 12 volt output port connectable to a cable device 400, described further below. 304 shows a flashlight control switch for activating flashlight LEDs 45. 305 is a USB input port for charging the internal lithium battery, and 306 is a USB output port for providing charge from the lithium battery to other portable devices such as smartphones, tablets, music players, etc. 307 is a "boost on" indicator showing that power is being provided to the 12V output port. 308 is a "reverse" indicator showing that the vehicle battery is improperly connected with respect to polarity. 309 is a "power on" indicator showing that the device is powered up for operation.

FIG. 4 shows a jumper cable device 400 specifically designed for use with the handheld device 300. Device 400 has a plug 401 configured to plug into 12 volt output port 303 of the handheld device 300. A pair of cables 402*a* and 402*b* are integrated with the plug 401, and are respectively connected to battery terminal clamps 403*a* and 403*b* via ring terminals 404*a* and 404*b*. The port 303 and plug 401 may be dimensioned so that the plug 401 will only fit into the port 303 in a specific orientation, thus ensuring that clamp 403*a* will correspond to positive polarity, and clamp 403*b* will correspond to negative polarity, as indicated thereon. Additionally, the ring terminals 404*a* and 404*b* may be disconnected from the clamps and connected directly to the terminals of a vehicle battery. This feature may be useful, for example, to permanently attach the cables 302*a*-302*b* to the battery of a vehicle. In the event that the battery voltage becomes depleted, the handheld booster device 300 could be properly connected to the battery very simply by plugging in the plug 401 to the port 303.

Current Sharing Switch Arrangement and Safety Switch

Figure 5:
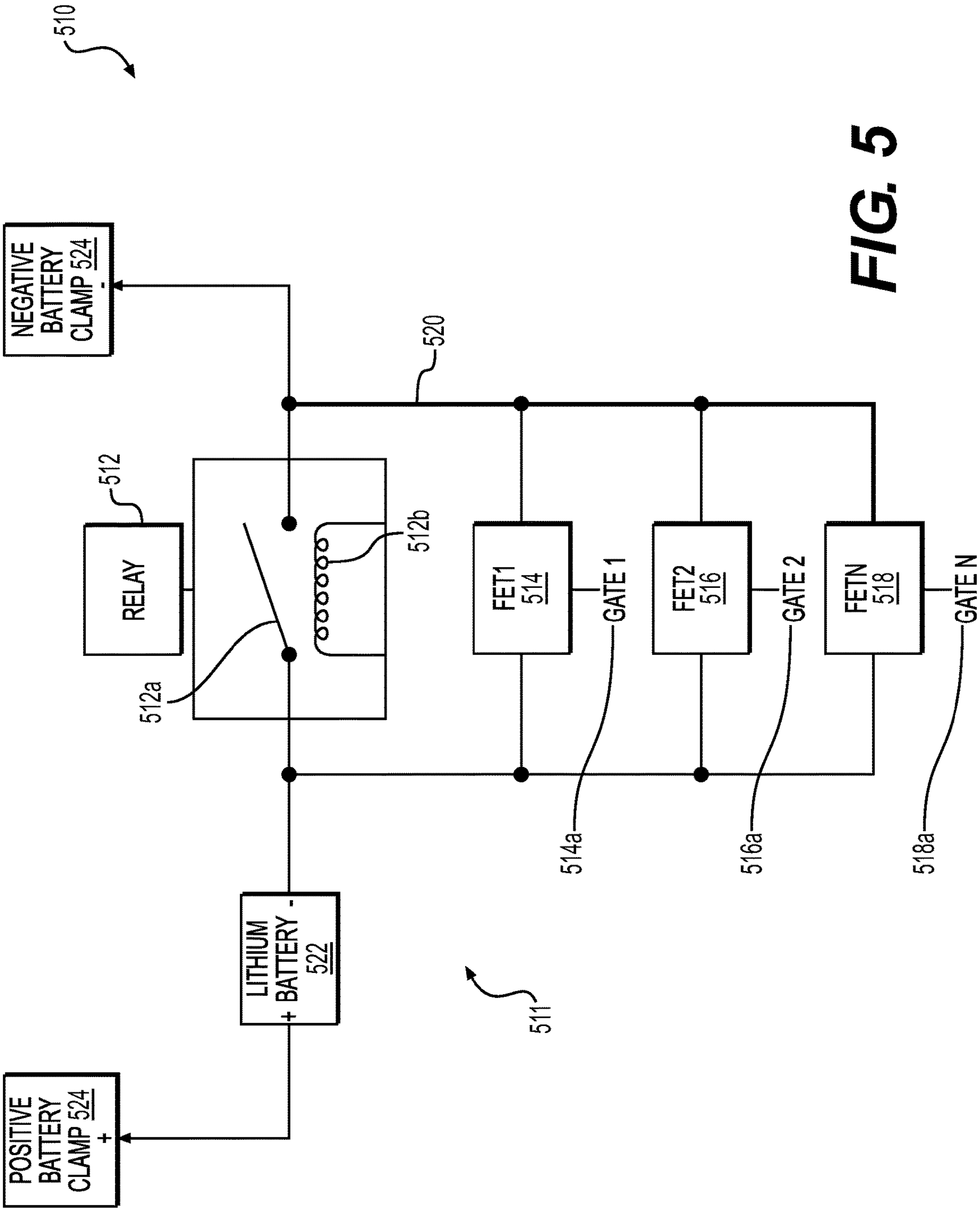
FIG. 5 is a diagrammatic view of an example of a jump starter according to the present invention comprising a power switch according to the present invention providing a current sharing arrangement between a relay and multiple FETs.

A jump starter 510 according to the present invention having a power switch 511 (e.g. smart switch) with a current sharing arrangement according to the present invention is shown in FIG. 5. The smart switch can be connected to and controlled by a microcontroller of the jump starter 510.

The jump starter 510 comprises a lithium ion rechargeable battery 522, a power switch 511, a conductor 520 (e.g. heavy duty conductor, conductive metal plate or bar, bus bar), a positive (+) battery clamp 24, and a negative (−) battery clamp 526, as shown in FIG. 5.

The positive (+) terminal of the lithium ion rechargeable battery 522 is connected to the positive (+) battery terminal and the negative (−) terminal of the lithium ion rechargeable battery 522 is connected to the power switch 511.

The power switch 511 comprises a relay 512 (i.e. primary switch) having a switch 512*a* and a coil 512*b*, and FETs 514, 516, 518 (i.e. secondary switch) arranged in parallel with the relay 512. The FET1 514, FET2 516, and FETN 518 comprise GATE1, GATE2, GATE N, respectively. The outputs of the relay 512 and FETs 514, 516, 518 are connected to a common conductor 520.

The conductor 520 is structured or configured to accommodate a significant amount of current. For example, the conductor 520 is a heavy duty conductor made of a conductive metal such as copper or aluminum, and configured as a heavy gauge wire, plate, bar, rod, tube, bus bar, or other suitable configuration for handling or accommodating significant current without being damaged. For example, the conductor 520 can be configured, designed, or tailored to accommodate same, similar, or different current levels or rates being outputted from the relay 12 and FETs 514, 516, 518 to the conductor 520 leading to the negative (−) battery clamp 524. For example, the FETs 514, 516, 518 can deliver increasing or decreasing current rates from the different FETs due to the configuration of the conductor 520 to minimize damage to the relay 512 and/or FETs 514, 516, 518 due to high current levels and/or power surges.

The relay 512 can be configured to accommodate a same or similar amount of current as the FETs 514, 516, 518. Alternatively, the relay 512 can be configured to accommodate significantly more current than the FETs 514, 516, 518. For example, the FETS 514, 516, 518 are bypass switches accommodating about ten percent (10%) to fifteen percent (15%) of the current passing through the power switch 511 and the relay 512 is configured to accommodate about eighty-five percent (85%) to ninety percent (90%) of the current passing through the power switch 511.

To begin charging operation of the jump starter 510, the relay switch 512*a* is closed to charge a depleted or discharged battery properly connected to the positive battery clamp 524 and negative battery clamp 526. For example, a portion of the current from the lithium ion battery 522 begins flowing through the relay 512, and after a slight delay (e.g. 1/100 millisecond delayed timing) current begins flowing through the FETs 514, 516, 518. Thus, the switching operation of the power switch 511 can include a sequence of initially closing the relay 512 and then subsequently closing the FETs 514, 516, 518. This sequence prevents the relay 512 and FETs 514, 516, 518 from being damaged by the current flowing through the power switch 511.

Further, the operation can include a sequence of opening the power switch 511 (e.g. after being initially closed) by first opening the FETs 514, 516, 518 and then subsequently opening the relay 512. For example, the relay 512 can be opened after a slight delay (e.g. 1/100 millisecond delayed timing) after the FETs are opened.

Thus, the overall sequence of switching power switch 511 is relay 512 first open, FETs 514, 516, 518 second open, FETs 514, 516, 518 first closed, and relay 512 second closed.

The current flows through the relay 512 and FETs 514, 516, 518 into the conductor 520, and the current is combined in the conductor 520.

The invention having been thus described, it will be apparent to those skilled in the art that the same may be varied in many ways without departing from the spirit or scope of the invention. Any and all such variations are intended to be encompassed within the scope of the following claims.

Battery Detection for Providing Safety

The jump starter according to the present invention comprises, for example, both a depleted or discharged battery detector and an active depleted or discharged battery detector. For example, the depleted or discharged battery detector is a vehicle battery detector (e.g. car battery detector) and the active depleted or discharged battery detector is an active vehicle battery detector (e.g. active car battery detector).

Figure 6:
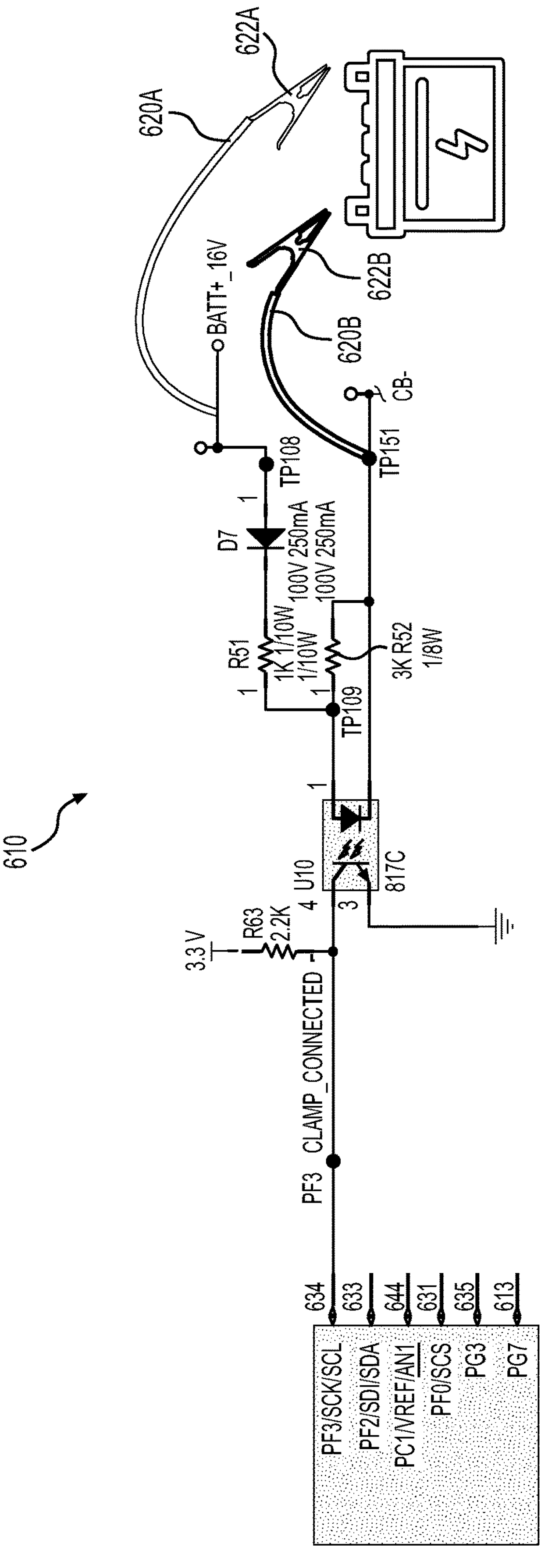
FIG. 6 is a schematic view of a circuit configured to provide a depleted or discharged battery detection (i.e. detects presence of depleted or discharged battery connected to jump starter).

For example, the circuit for a depleted or discharged battery detector 610 according to the present invention for use in the jump starter according to the present invention is shown in FIG. 6.

The depleted or discharged battery detector 610 comprises one or more opto-isolators 612 to detect the presence of a depleted or discharged battery 614.

The jump starter according to the present invention comprises a system using the information from the depleted or discharged battery detector 610, as well as input from a short circuit detector 616, a depleted or discharged battery reverse polarity detector 618, and an active depleted or discharged battery detector 620 to decide whether to turn on power from the jump starter to the depleted or discharged battery 614 during a charging or boost cycle (e.g. Autoboost mode) by closing a jump starter switch (e.g. smart switch).

If during a boost cycle (e.g. after smart switch has been closed), the depleted or discharged battery 614 and the internal battery of the jump starter are so close in potential that no current flow is detected by the automatic depleted or discharged battery detector, the system temporarily opens the smart switch, and the depleted or discharged battery detector verifies that the depleted or discharged battery is still attached to the battery clamps of the jump starter.

Figure 7:
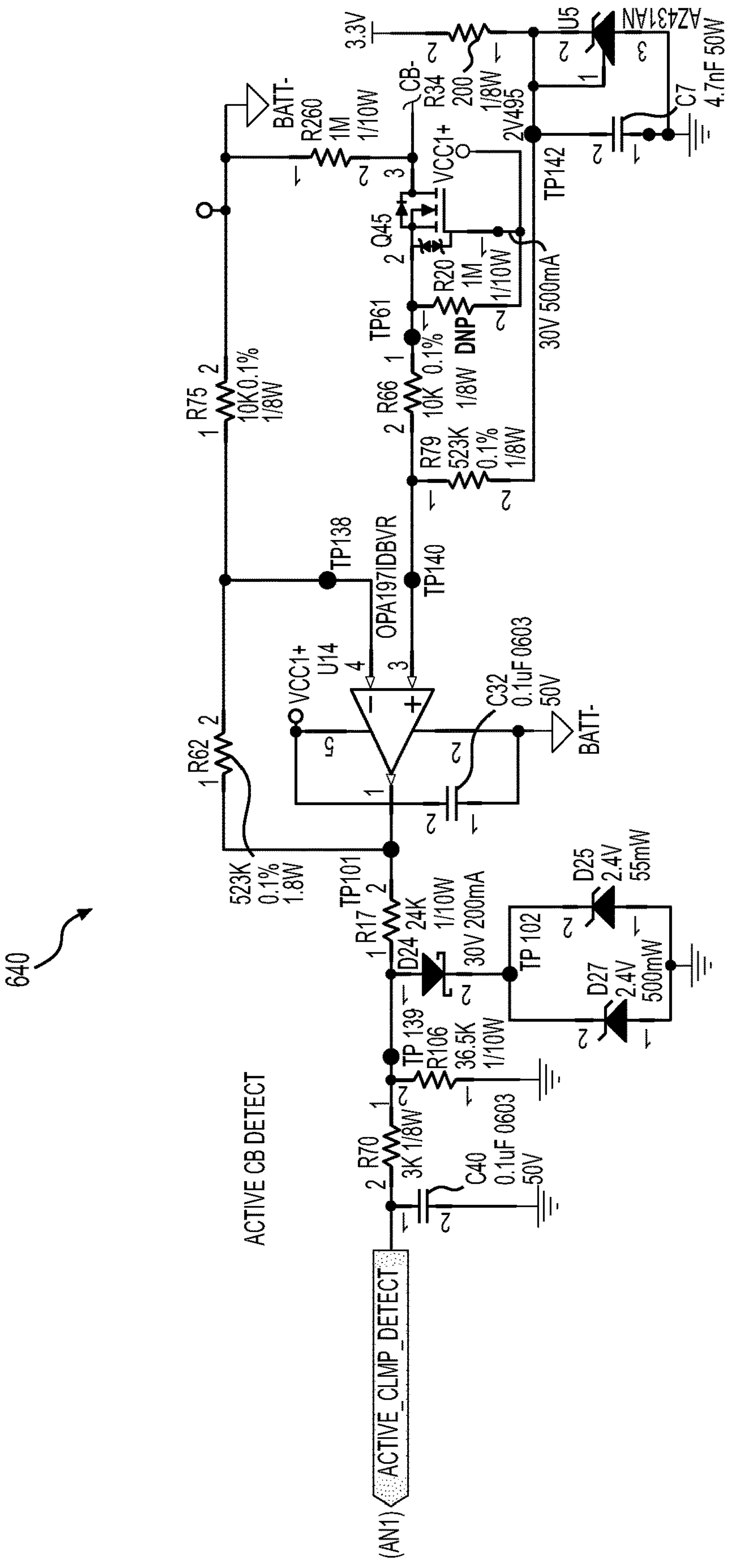
FIG. 7 is a schematic view of a circuit configured to provide an active depleted or discharged battery detection (i.e. also detects presence of depleted or discharged battery connected to jump starter).

For example, the circuit for an active depleted or discharged battery detector 620 according to the present invention for use in the jump starter according to the present invention is shown in FIG. 7.

The active depleted or discharged battery detector comprises an operational amplifier-based circuitry to measure the current flow across the smart switch (i.e. current flow from the internal battery of the jump starter to the depleted or discharged battery).

The "zero point" is setup so current flow can be measured in both directions (i.e. from the internal battery of the jump starter to the depleted or discharged battery and vice versa).

When the battery clamps are connected to the depleted or discharged battery, an active depleted or discharged battery detect value (AN1) is below the "zero point" when the depleted or discharged battery voltage is higher than the internal battery voltage of the jump starter. Therefore, the system checks this signal after there has been a depleted or discharged battery detected at the battery clamps by the depleted or discharged battery detector and before going into Autoboost mode preventing a high voltage depleted or discharged battery from being connected to the system.

During automatic boost, the current flow is constantly being measured to ensure a battery clamp is not suddenly disconnected and shorted, for example, to a vehicle (car) chassis.

In contrast, if the jump starter does not have blocking diodes, current can flow in both directions between the internal battery of the jump starter and the depleted or discharged battery. For example, an algorithm can be used to allow the internal battery of the jump starter to be recharged by the depleted or discharged battery, if the depleted or discharged battery is extremely discharged (e.g. less than vehicle alternator voltage).

If current is detected flowing from the depleted or discharged battery to the internal battery of the jump starter, the algorithm can consider the battery capacity, maximum charge current, and battery temperature of the internal battery of the jump starter to decide for how long to allow a back-charged current from the depleted or discharged battery to the internal battery of the jump starter to flow.

The system can then exit charging or boosting the depleted or discharged battery (e.g. smart switch turned off) if the parameter above are met or if an automatic timer expires (e.g. in Autoboost mode).

Portable Jump Starter and Air Compressor Device

Figure 8:
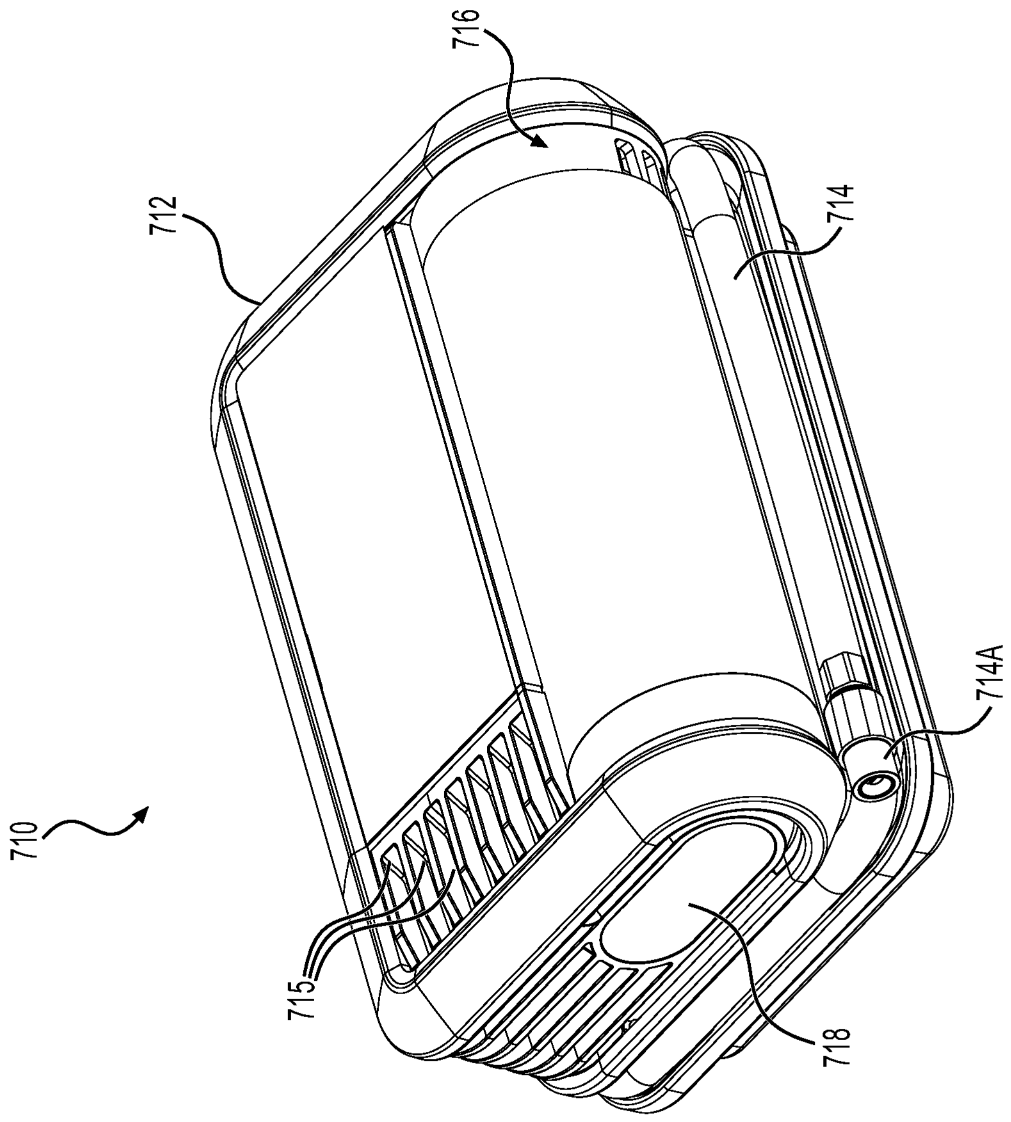
FIG. 8 is a perspective view of a portable jump starter and air compressor device according to the present invention, for example, with an opaque cover.
Figure 9:
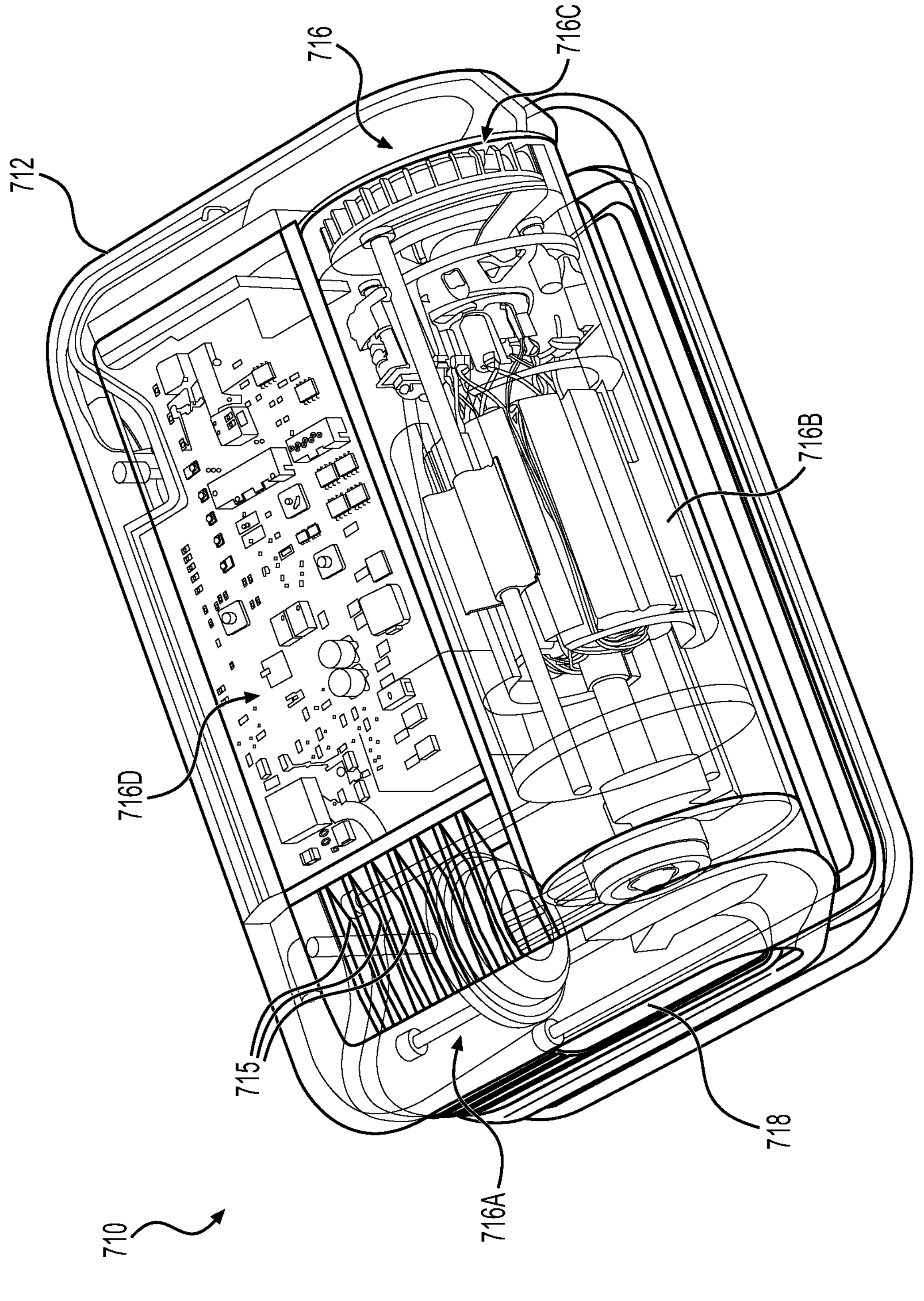
FIG. 9 is a perspective view of a portable jump starter and air compressor device according to the present invention with a transparent cover.
Figure 10A:
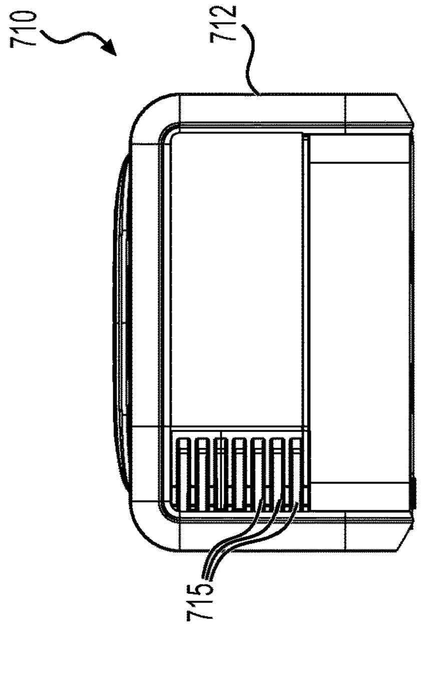
FIG. 10A is a top view of the portable jump starter and air compressor device shown in FIG. 8.
Figure 10B:
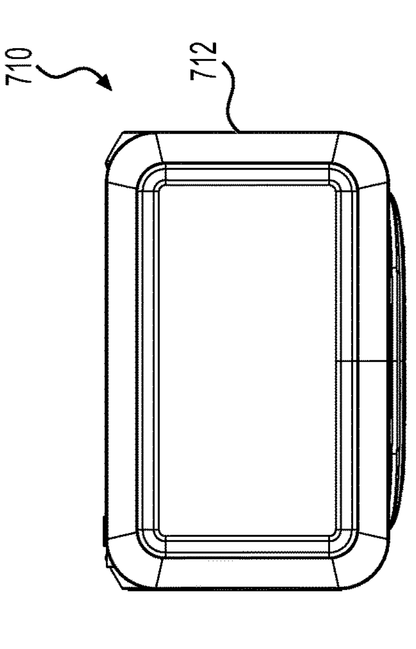
FIG. 10B is a bottom view of the portable jump starter and air compressor device shown in FIG. 8.
Figure 10C:
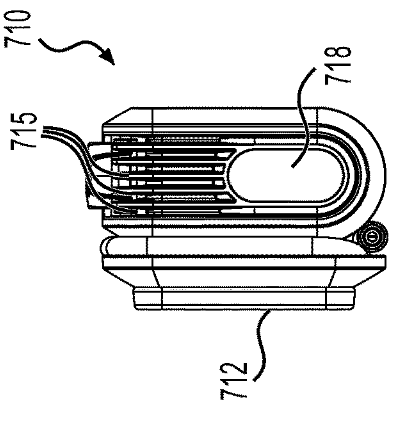
FIG. 10C is a left side view of the portable jump starter and air compressor device shown in FIG. 8.
Figure 10D:
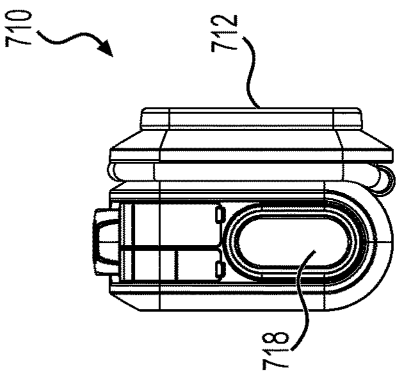
FIG. 10D is a right side view of the portable jump starter and air compressor device shown in FIG. 8.
Figure 10E:
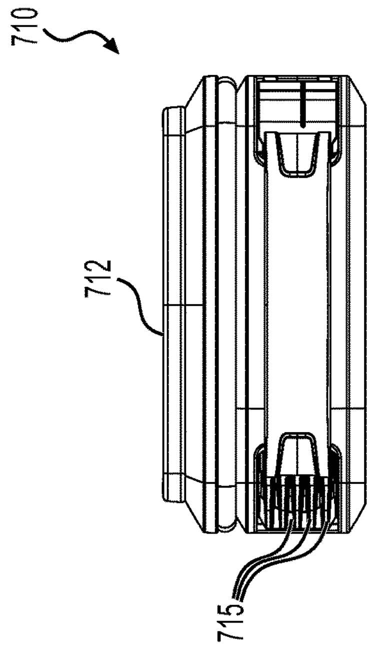
FIG. 10E is a rear view of the portable jump starter and air compressor device shown in FIG. 8.

A portable jump starter and air compressor device 710 according to the present invention, for example, is shown in FIGS. 8-10.

The portable jump starter and air compressor device 710 comprises a cover 712, an air hose 714 having a hose end 714A (e.g. magnetic air hose end), an air compressor 716 (e.g. air pump), a display 18 (e.g. graphic user interface (GUI), and a rechargeable battery (e.g. rechargeable lithium-ion battery) 20. The air compressor 716 is a piston-type air compressor, however, other types of air compressors can replace the air compressor 716 such as a rotary air compressor, centrifugal air compressor, diaphragm-type air compressor).

The air compressor 716 comprises a reciprocating piston assembly 716A (e.g. cylindrical-shaped piston, oval-shaped piston, etc.), an electrical motor 716B driving the reciprocating piston assembly 716A and a cooling fan 716C. The air hose 14 is connected to the air compressor 16 for supplying pressurized air from the air compressor 16.

The portable jump starter and air compressor device 710 further comprises a jump starter 722 having a circuit board 722A.

The portable jump starter and air compressor device 710 comprising the air compressor 716, reciprocating piston assembly 716A, electrical motor 716B, cooling fan 716C, electronics, including sensors and controls, and display 718, for example, are all integrated into a single cover 712. The portable jump starter and air compressor device 710 further comprises a heat sink 724 for the electrical motor 716B (e.g. housing of the electrical motor 716B), which are exposed to and cooled by air circulating within and out of the cover 712 by the cooling fan 716C.

The portable jump starter and air compressor device 710 according to the present invention, for example, as shown in FIGS. 1-3, includes the following features:

1) pass-through power;
2) autodetect air/power/battery;
3) magnetic air hose end;
4) self-calibrating pressure gauge;
5) thermally optimized battery (e.g. rechargeable lithium-ion battery);
6) flush-mount piston valve design;
7) integrated compressor assembly; and
8) overall design and design features.

FIG. 9 is a perspective view of a portable jump starter and air compressor device 710 with a transparent cover. The example illustrated in FIG. 9 provides an integrated compressor in which the motor, compressor, cooling fan, sensors, controls, interface display, etc. are all integrated into a single body, where the compressor heat sinks and motor housing are exposed.

FIGS. 10A-10E show different views of the portable jump starter and air compressor device shown in FIG. 8.

Pass Through Power

Figure 17:
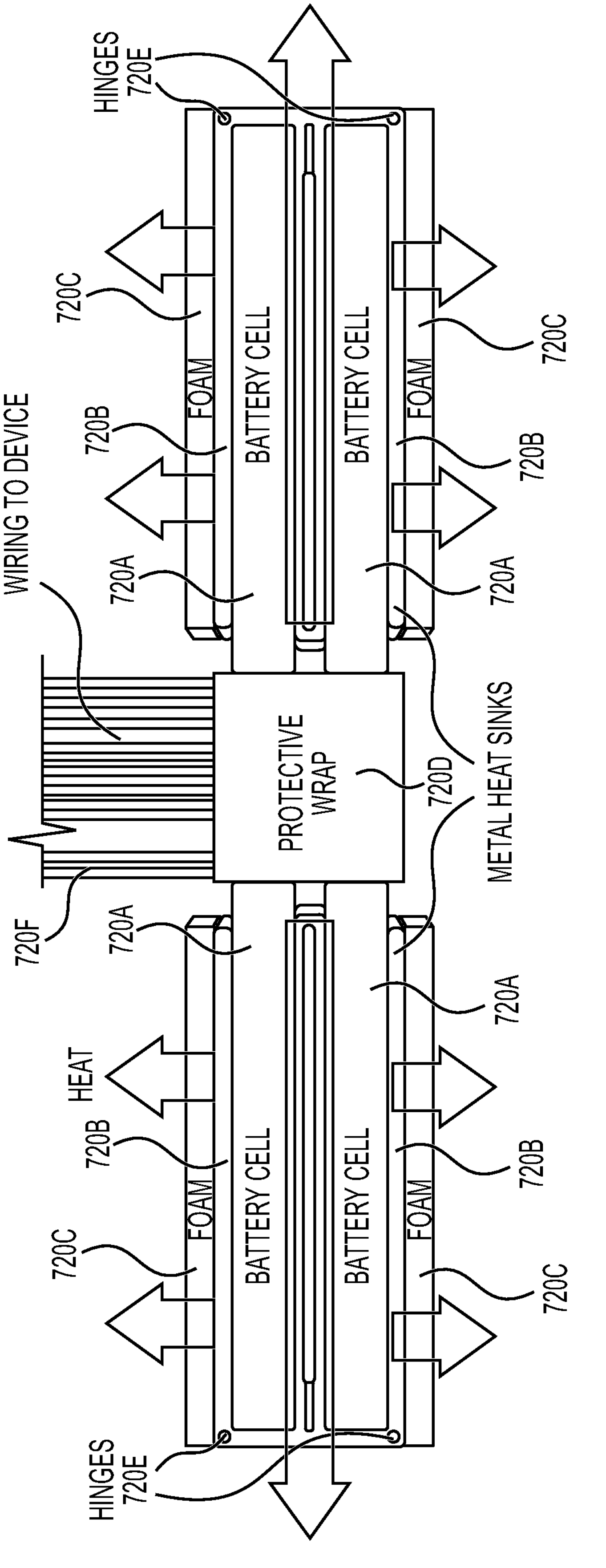
FIG. 17 is a diagrammatic side view showing the configuration of a Li-ion battery according to the present invention for use in the portable jump starter and air compressor device according to the present invention.
Figure 18:
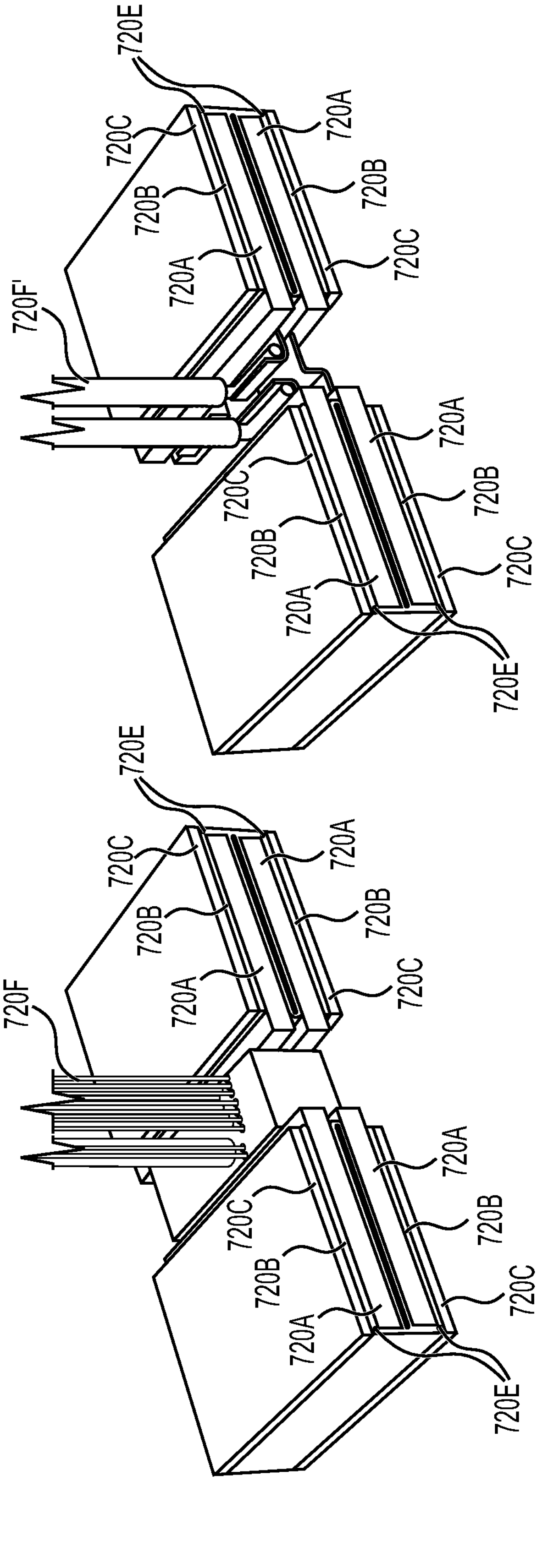
FIG. 18 are perspective views showing the configuration of two (2) versions of the Li-ion battery.

The portable jump starter and air compressor device 710 can be powered by an internal power supply (e.g. battery, rechargeable battery 720, rechargeable Li-ion battery, as shown in FIGS. 17 and 18), or powered from an external source (e.g. vehicle battery, cigarette lighter, electrical vehicle port (e.g. USB, USB-C), DC power supply, AC power supply with AC/DC converter located external and/or internal relative to the portable jump starter and air compressor device 710.

Figure 11:
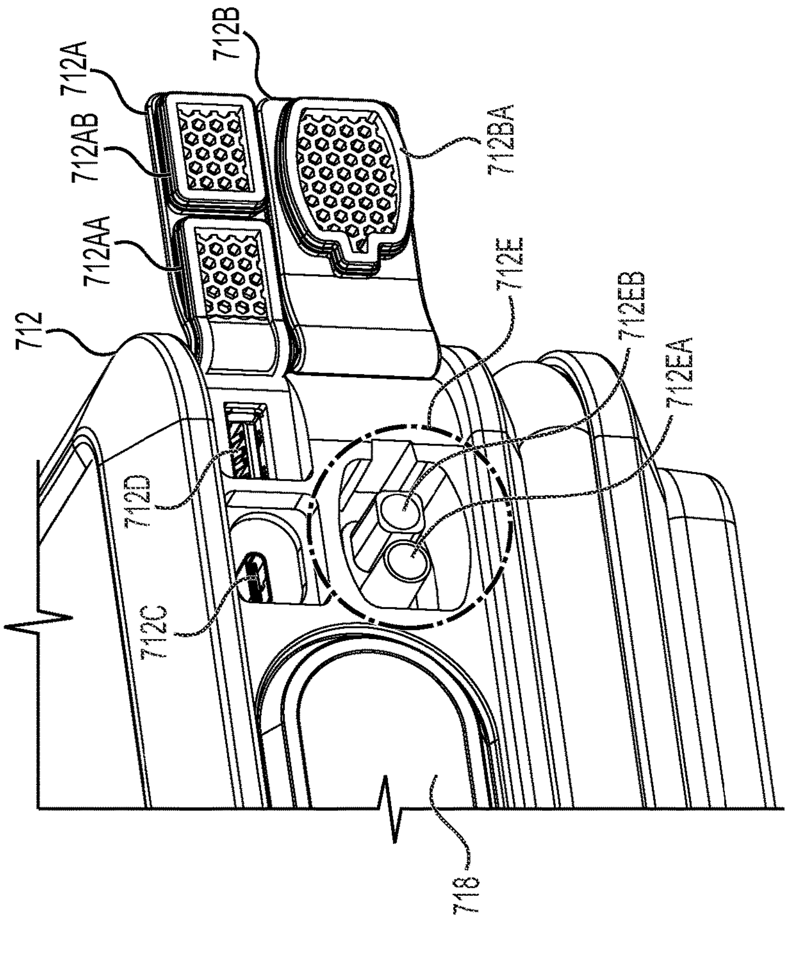
FIG. 11 is a perspective view of an end of the portable jump starter and air compressor device shown in FIG. 8 with cover access doors opened to provide access to electrical connection ports.

An electrical port 726, for example, as shown in FIG. 11, is used for pass-through power and for jump starting (e.g. boosting or charging a depleted or discharged battery). When the pass-through cable 728 is plugged in, a switch 728A (FIG. 13), for example, is activated that routes air compressor power to one or more power ports via relays. Jump starting will be deactivated when the pass-through cable 728 is present to prevent, for example, a longer, lighter-gauge cable from being damaged.

When a jump starter cable 730 is plugged-in to the electrical port 726, the switch 728A (FIG. 13) is not activated, allowing the jump starting mode to take place. Power is not routed from the internal rechargeable battery 720 to the electrical port 726 via relays unless an external depleted or discharged battery is detected (i.e. present) and properly connected (i.e. connected with correct polarity) to the portable jump starter and air compressor device 710. Alternatively, a manual override (e.g. manual override push button) is activated to apply boosting or charging power from the portable jump starter and air compressor device 710 to the externally located depleted or discharged battery being boosted or charged.

Internal battery power, for example, is routed to the air compressor 716 via relays once a user presses an "AIR" button, and no voltage is present at the electrical port 726.

Figure 12:
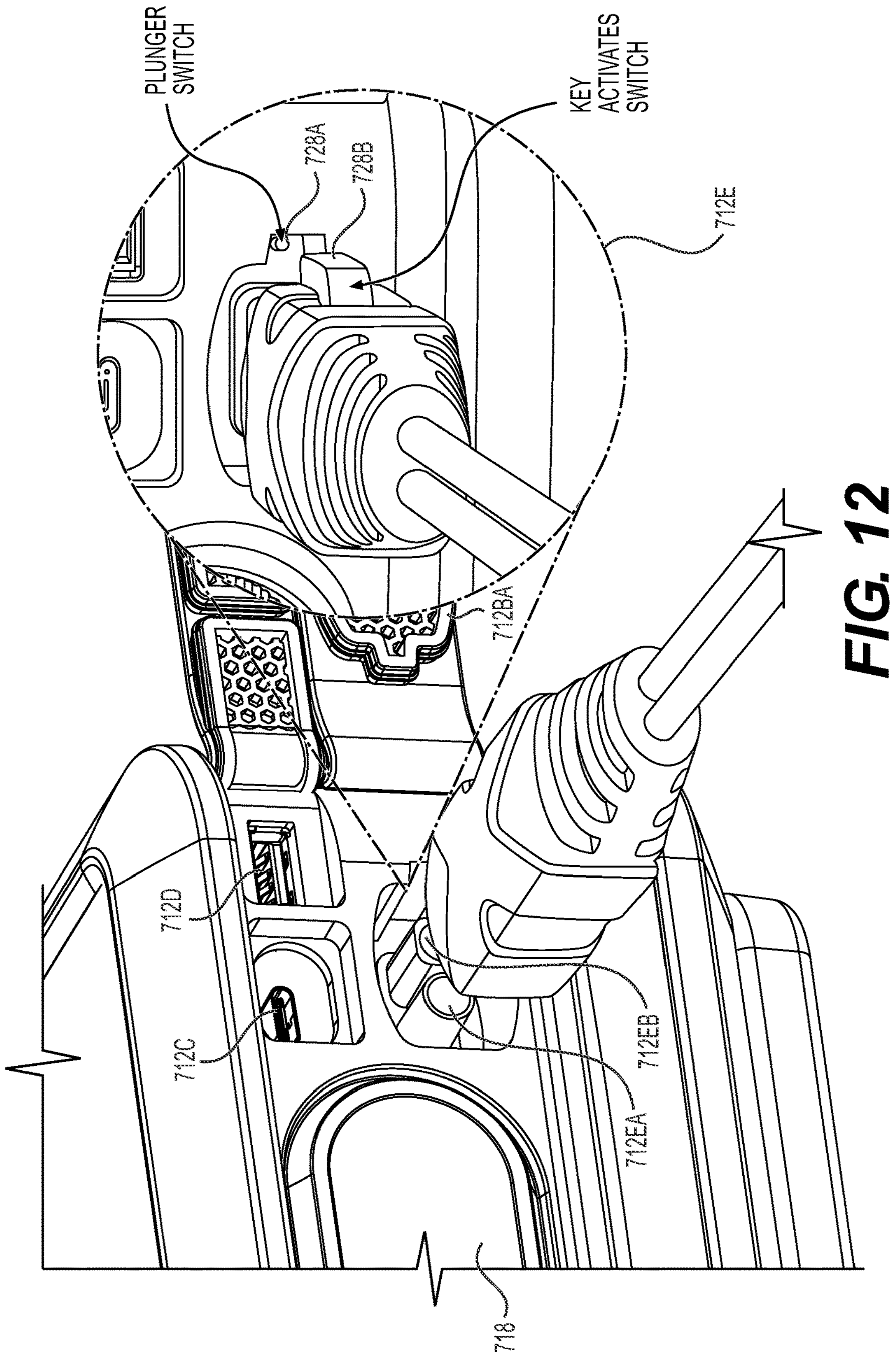
FIG. 12 is a perspective view of an end of the portable jump starter and air compressor device shown in FIG. 8 with cover access door opened to provide cable connection with portable jump starter and air compressor.
Figure 13:
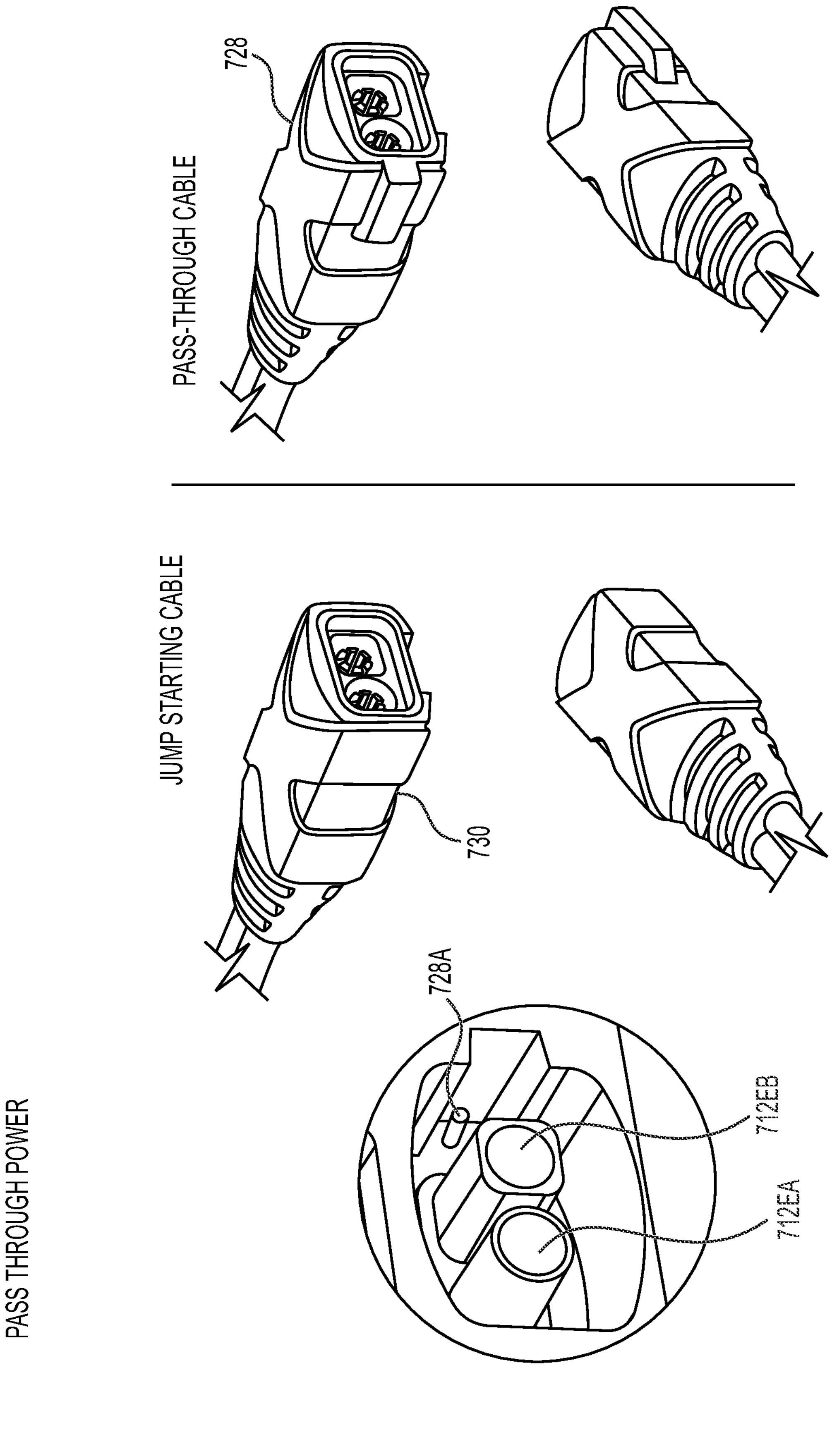
FIG. 13 are perspective views of the end of the plugs for the jump starting cable and the pass-through cable for use with the portable jump starter and air compressor device according to the present invention.
Figure 14:
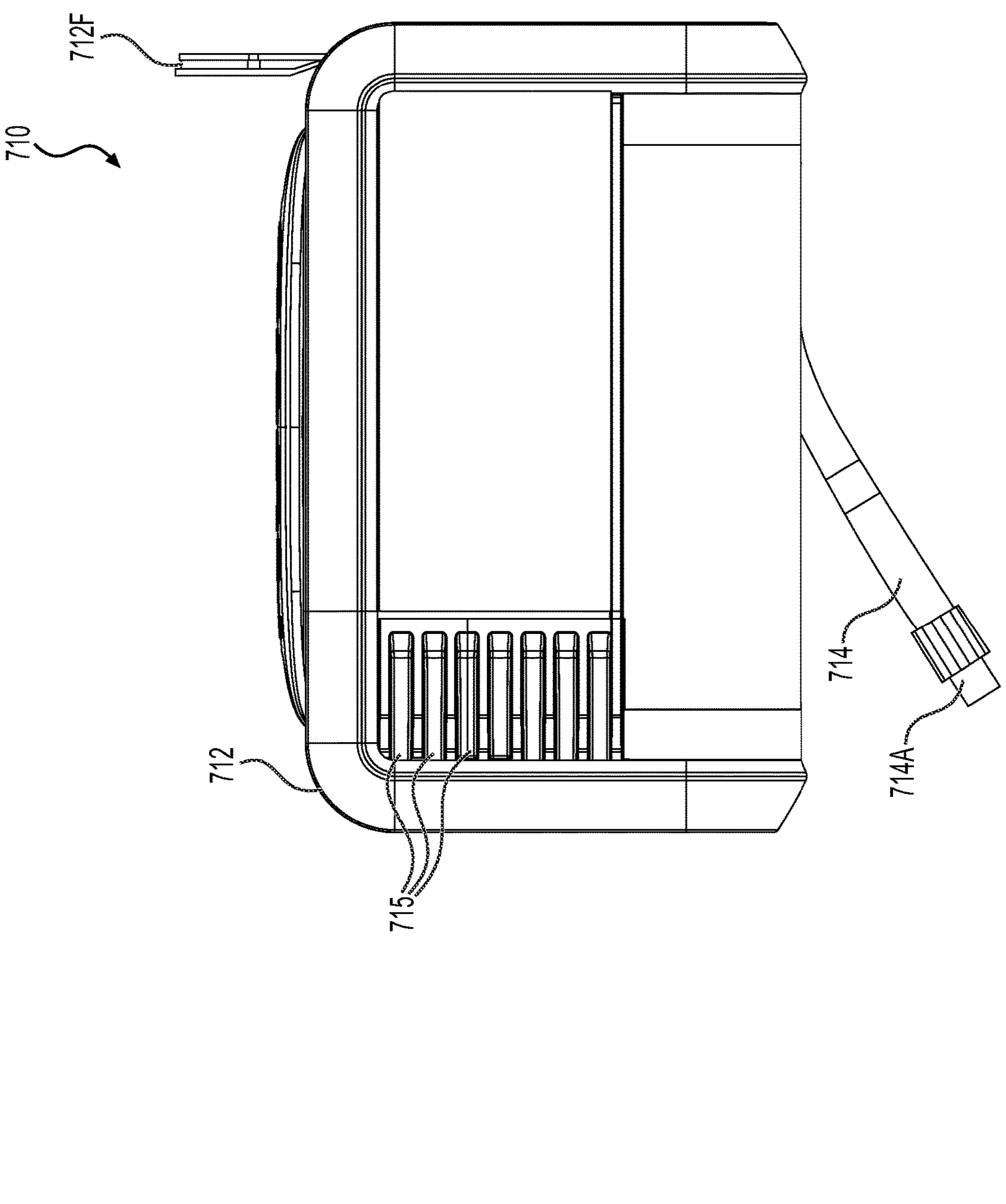
FIG. 14 is a side view of portable jump starter and air compressor device shown in FIG. 8.

Alternatively, for example, as shown in FIG. 13, instead of using a switch 728A located on the electrical port 712E, a 3rd pin 728A can be located on the pass-through cable 728 that is either connected to a positive (+) voltage or ground, and then gets connected to another pin 728A on the electrical port 726 (FIG. 12) when plugged in. An example of the pass-through cable 728 (with pin) is shown on the right-hand side of FIG. 13, and the jump starter cable 730 (without pin) is shown on the left-hand side of FIG. 13. The pass-through cable 728 is designed not to fit into a jump starting (boost) port for safety.

The portable jump starter and air compressor device 710 can be provided with a USB-C port 712C (FIG. 12) for providing power and communication(s) input or output of the portable jump starter and air compressor device 710. Another port 712D (e.g. USB, USB-A, USB-C) computer, communications, video, ethernet, LAM connector) can be also be provided on the portable jump starter and air compressor device 710.

The power/communication ports 712C, 712D can be provided with a door 712A (e.g. having a perimeter sealing edge or seal) to protect the ports 712C, 712D. The electrical port 712E can be provided with a door 712E (e.g. having a perimeter sealing edge or seal) to protect the electrical port 712E and conductive prongs 712EA (round-shaped) and 712EB (square-shaped), as shown in FIG. 11.

In the example illustrated in FIG. 11, the compressor can be powered by the internal battery or from an external source (i.e., a car battery, cigarette lighter). The same port may be used for pass through power and jump starting. When the pass through cable is plugged in, a switch may be activated that routes compressor power to the power port via relays. Jump starting may be deactivated when the pass through cable is present to prevent the longer, lighter-gauge cable from being damaged. When a jump start cable is plugged in, the switch is not activated, allowing jump starting to take place. Power is not routed from the internal battery to the power port via relays unless an external battery is detected or manual override is used. Internal battery power may be routed to the compressor via relays once the user presses the "AIR" button and no voltage is present at the port. In another example, instead of utilizing a switch, a 3rd pin may be located on the pass through cables, with the 3rd pin being either connected to positive voltage or ground and being connected to a pin on the unit when plugged in.

Autodetect Air/Power/Battery

The portable jump starter and air compressor device 710 can have different modes to accommodate different functions. For example, as shown in FIG. 19, after powering on the portable jump starter and air compressor device 710, the portable jump starter and air compressor device 710 can be configured (e.g. programmed) to automatically detect which mode to activate, which, for example, will be indicated via the display 718 (e.g. graphic user interface).

For example, the different modes can include:

1) MODE 1—air compressor [battery powered] detects air pressure at hose+pass-through switch is not activate=displays "air" mode;
2) MODE 2—air compressor [external power] with pass-through switch activated=displays "air" mode [disables jump start mode];
3) MODE 3—jump starter [battery powered] detects external battery voltage+pass-through switch is not activated=no air pressure detected=activates jump start sequence; and
4) MODE 4 standby [battery powered] with no air pressure at hose+no external battery voltage+pass-through switch not active=unit stays In standby waiting for manual activation of air or jump starter.

Figure 15A:
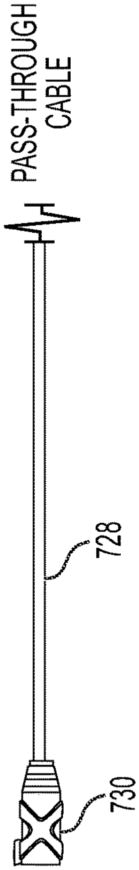
FIG. 15A is a top view of the pass-through cable for use with the portable jump starter and air compressor device according to the present invention.
Figure 15B:
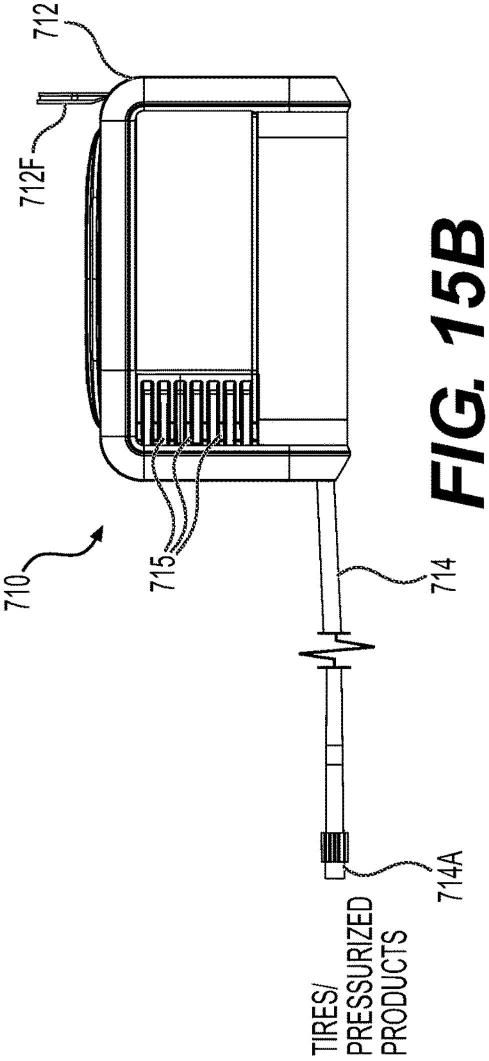
FIG. 15B is a side view of the portable jump starter and air compressor device according to the present invention.
Figure 15C:
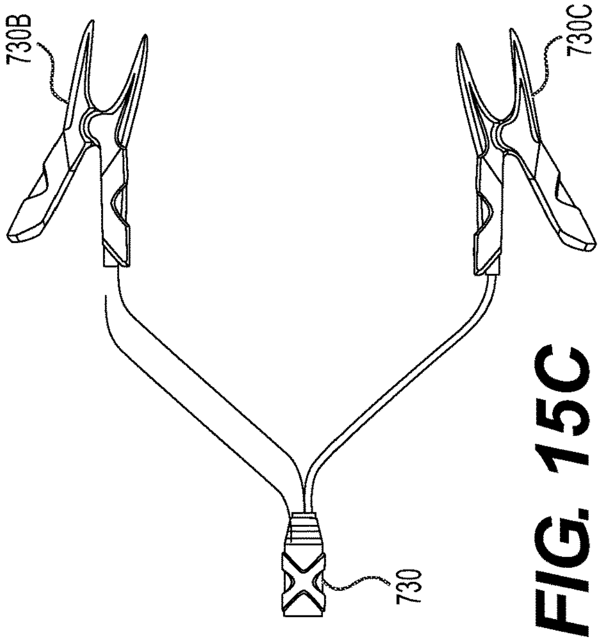
FIG. 15C is a top view of the jump starting cable for use with the portable jump starter and air compressor device according to the present invention.

The operation of the portable jump starter and air compressor device 710 using the different cable arrangements is shown in FIG. 15. FIG. 15A is a top view of the pass-through cable for use with the portable jump starter and air compressor device. FIG. 15B is a side view of the portable jump starter and air compressor device. FIG. 15C is a top view of a jump starting cable for use with the portable jump starter and air compressor device. The portable jump-starter and air compressor device may (1) detect if a 12 VDC power cable is connected and, if so, disable jump starting (boost) mode, (2) detect if air pressure is present and, if so, default to air mode, and (3) detect if a battery is present and, if so, default to jump-starting mode.

Magnetic Air Hose End

Figure 16:
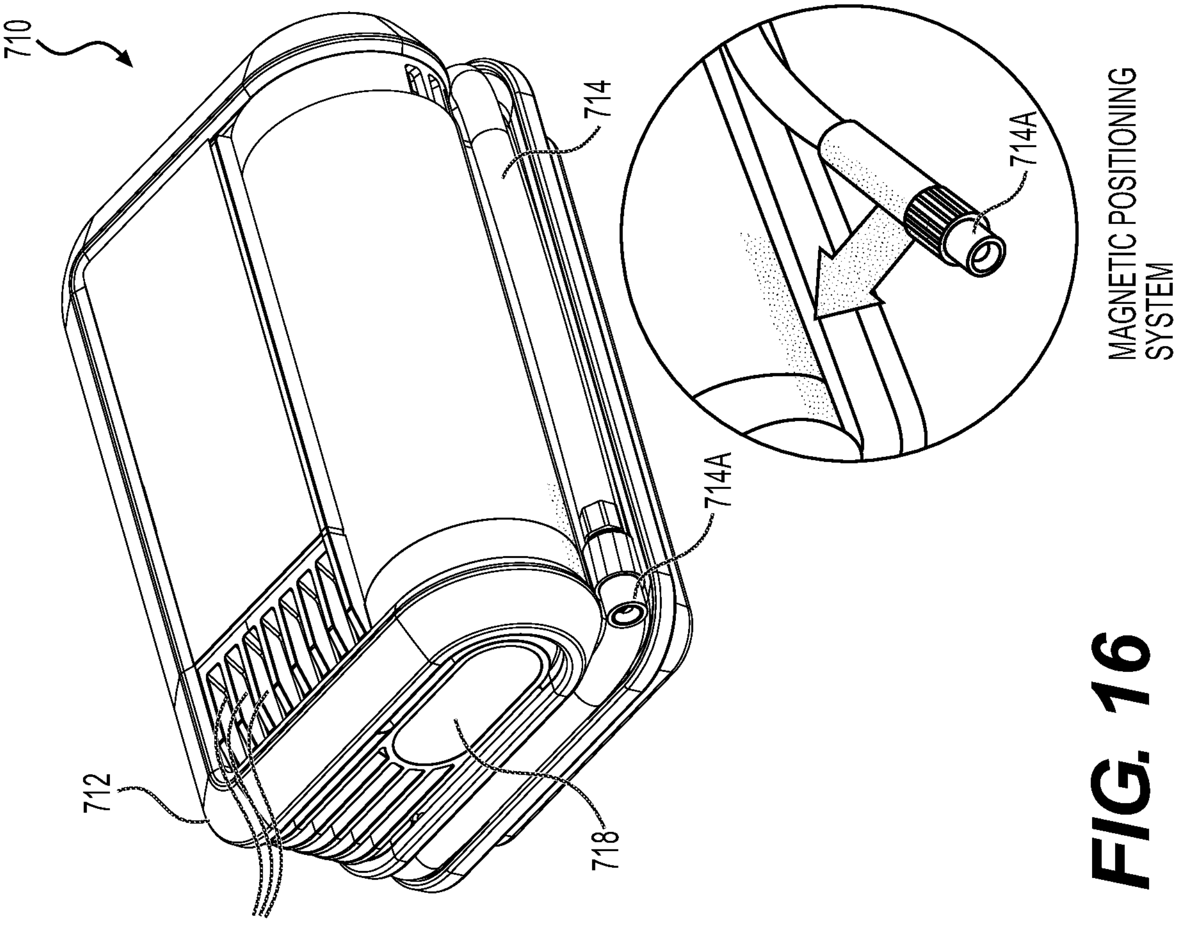
FIG. 16 is a perspective view of portable jump starter and air compressor device according to the present invention provide with an air hose having a magnetic cable end.

The magnetic air hose end is shown in FIG. 16. To simplify wrapping of the air hose 714 around the portable jump starter and air compressor device 710 (e.g. around cover 712), a magnet is incorporated into the end of the air hose end 714A to secure it into the proper position magnetically. The air hose can be coupled to the motor stator on the device or a separate ferritic piece. A ferritic material may also be incorporated into the hose end with a magnet being located on the device. For example, a metal plate or disc is provided on the cover 712 (e.g. insert molded) to magnetically connect the magnetic air hose end 714A to the cover 712 of the portable jump starter and air compressor device 710.

Thermally Optimized Battery Configuration

The rechargeable battery 720 (e.g. rechargeable Li-ion battery) heats up under load, and the constant power drain from the air compressor 716, for example, requires a battery configured to dissipate heat. For example, the Li-ion battery 720 (Li) is configured to draw heat from the Li-ion battery cells 720A (Li) during charging/discharging of the Li-ion battery cells 720A (Li). For example, the Li-ion battery 720 (Li) and/or Li-ion battery cells 720A (Li) are provided with one or more heat sinks 724 to draw heat out of and away from the Li-ion battery cells 720A (Li) and the rechargeable Li-ion battery 720 (Li), as shown in FIG. 17.

Further, a solid enclosure for the battery cells can be provided to protect the Li-ion battery cells 720A (Li) from impact to the surrounding plastic housing(s). This arrangement allows the Li-ion battery cells 720A (Li) to swell while still maintaining contact with the heat sink 24.

The rechargeable Li-ion battery 720 (Li), for example, incorporates two (2) heat sinks 720B (e.g. extruded metal heat sinks) with built-in hinges 720E, as shown in FIG. 18. As the Li-ion battery cells 720A swell when heating up, the top and bottom of the heat sinks 720B flex with the hinges 720E being the rotational points. The Li-ion battery cells 720A (Li) maintain contact with the heat sinks 720B as they swell to allow heat dissipation to continue, as the Li-ion battery cells 720A swell. Further, foam layer 720C are compressed between the respective heat sinks 720B and the plastic enclosure(s).

An air gap is present in the middle of the heat sinks 720B between the battery cells 720A to help prevent or slow heat transfer between the Li-ion battery cells 720A (Li). A thermal paste can be placed between the Li-ion battery cells 720A (Li), and the heat sinks 720B to facilitate heat transfer. The foam layers 720C can be replaced with thermal pads to transfer heat to the external housing(s).

Flush-Mount Piston/Valve

Figures 19A, 19B, 19C:
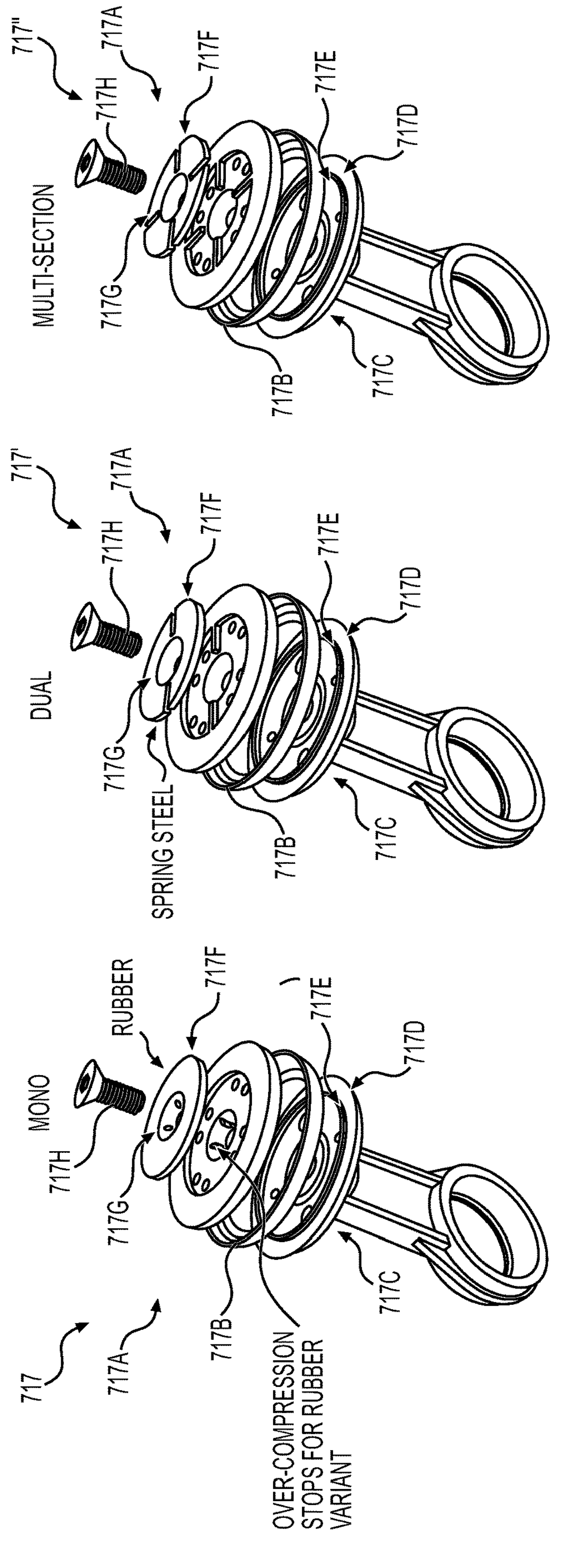
FIG. 19A is a perspective view of a piston assembly (MONO version) for the portable jump starter and air compressor device according to the present invention.
FIG. 19B is a perspective view of another piston assembly (DUAL version) for the portable jump starter and air compressor device according to the present invention.
FIG. 19C is a perspective view of a further piston assembly (MULTI-SECTION version) for the portable jump starter and air compressor device according to the present invention.

The air compressor 716, for example, includes a flush-mounted piston/valve arrangement. For example, three (3)

examples of the flush-mounted piston/valve arrangements are shown in FIGS. 19A, 19B, 19C.

The first example (i.e. left view, FIG. 19A) of the flush-mounted piston/valve assembly 717 comprises a piston 717A mounted on a connecting rod 717C. The piston 717A comprises, for example, a lower piston 717D (e.g. circular-shaped plate having a center through hole with surrounding through holes (e.g. four), a circular-shaped piston ring 717E (e.g. a circular-shaped ring cooperating with the circular-shaped lower piston 717D, and a circular-shaped upper piston 717F, assembled together as shown. A center through hole is provided with over-compression stops for accommodating a circular-shaped seal 717G (e.g. rubber seal). The circular-shaped seal 717G is mounted in a circular-shaped indent or cavity located on top of the upper piston 717F, and secured therein by a single threaded screw 717H, as shown (i.e. mono arrangement).

The circular-shaped lower piston 717D, piston ring 717E, upper piston 717F, circular-shaped seal 717G, and indent or cavity located on top of the upper piston 717F of the mono arrangement can have other shapes (e.g. oval-shaped, square-shaped, modified square-shaped (e.g. rounded corners), triangular-shaped, modified triangular-shaped (e.g. rounded corners), custom-shaped (e.g. double circle with some overlap), kidney-shaped, heart-shaped, etc.

Alternatively, the air compressor 716 can comprise multiple pistons and multiple sets of plates, rings, seals, indents or cavities. In addition, the seal 717G can be made of various materials other than rubber (e.g. flexible materials) suitable for air sealing applications, including plastic, nylon, polyethylene, polypropylene, urethane, composite, Kevler, carbon graphite, metal, metal composites, etc.).

The second example (i.e. center view, FIG. 19B) of the flush-mounted piston/valve assembly 717 comprises a piston 717A' mounted on a piston rod 717C'. The piston 717A' comprises, for example, a lower piston 717D' (e.g. circular-shaped plate having a center through hole with surrounding through holes (e.g. four), a piston ring 717E' (e.g. a circular-shaped ring cooperating with the circular-shaped lower piston 717D' and an upper piston 717F'), assembled together, as shown. The top of the piston 717A' is provided with a circular-shaped cavity provided with dual radial protrusions for supporting a bottom of the circular-shaped seal 717G' (e.g. rubber seal). The circular-shaped rubber seal 717G' having dual radially opposed slots is mounted in the circular-shaped seal 717G' located on top of the piston 717A', and secured therein by a single threaded screw 717H', as shown (i.e. dual arrangement).

The circular-shaped lower piston 717D', piston ring 717E', upper piston 717F', circular-shaped seal 717G', and indent or cavity located on top of the upper piston 717F' of the dual arrangement can have other shapes (e.g. oval-shaped, square-shaped, modified square-shaped (e.g. rounded corners), triangular-shaped, modified triangular-shaped (e.g. rounded corners), custom-shaped (e.g. double circle with some overlap), kidney-shaped, heart-shaped, etc.

The third example (i.e. center view, FIG. 19C) of the flush-mounted piston/valve assembly 717" comprises a piston 717A" mounted on a piston rod 717C". The piston 717A" comprises, for example, a lower piston 717D"(e.g. circular-shaped plate having a center through hole with surrounding through holes (e.g. four), a piston ring 717E" (e.g. a circular-shaped ring cooperating with the circular-shaped lower piston 717D" and an upper piston 717F"), assembled together, as shown. The top of the piston is provided with a circular-shaped cavity provided with four (2) radial protrusions for supporting a bottom of a circular-shaped seal 717G" (e.g. rubber seal). The seal 717G" has four (4) radial slots, and is mounted in a circular-shaped indent or cavity located on top of the piston 717A" and secured therein by a single threaded screw 717H" (i.e. multi-section arrangement).

The circular-shaped lower piston 717D", piston ring 717E", upper piston 717F", circular-shaped seal 717G", and indent or cavity located on top of the upper piston 717F" of the multi-section arrangement can have other shapes (e.g. oval-shaped, square-shaped, modified square-shaped (e.g. rounded corners), triangular-shaped, modified triangular-shaped (e.g. rounded corners), custom-shaped (e.g. double circle with some overlap), kidney-shaped, heart-shaped, etc.

Figure 20:
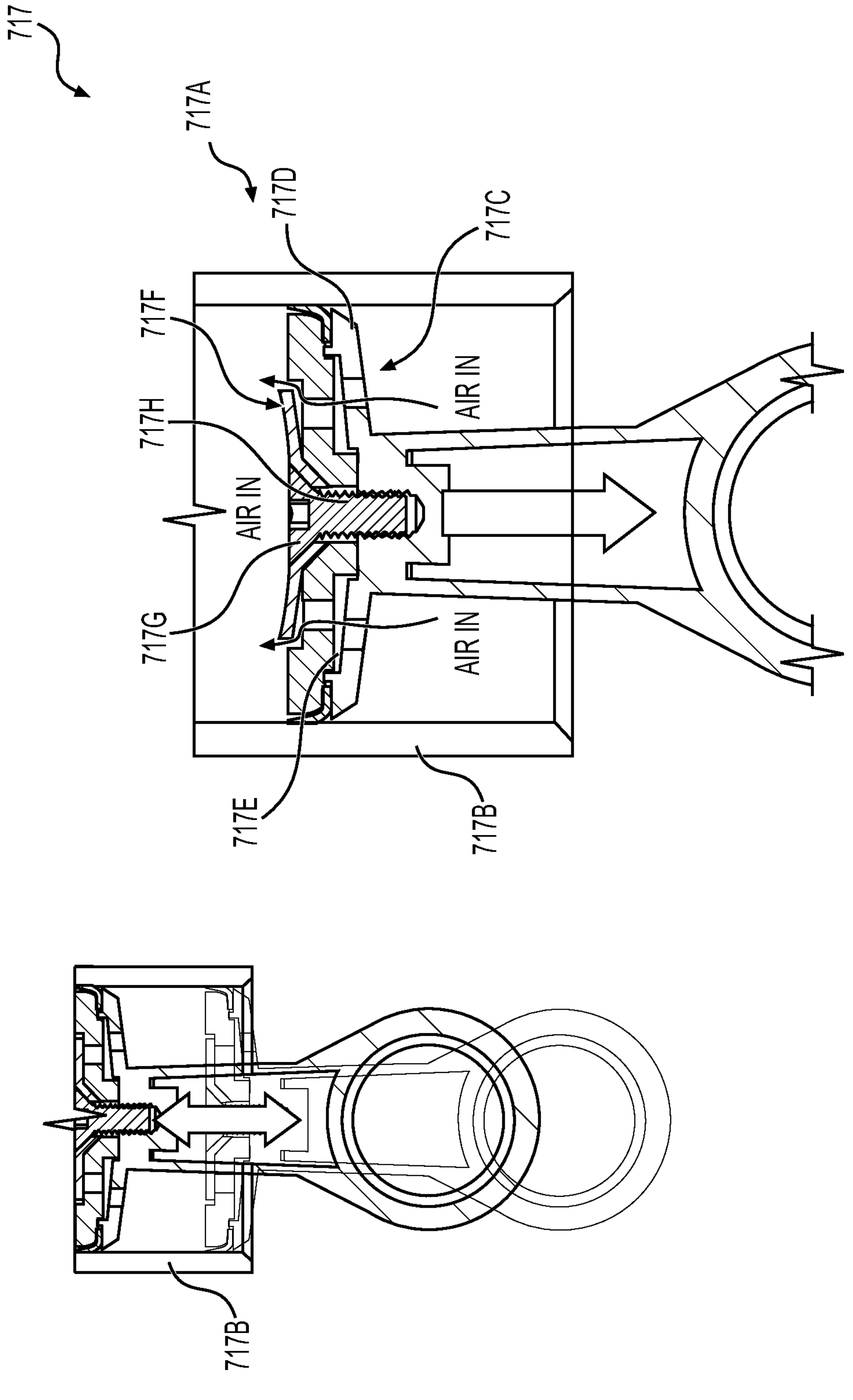
FIG. 20 is a side cross-sectional view of compressor piston moving within a cylinder of the piston assembly.

The operation of the flush-mounted piston/valve 717, 717', 717", is shown in FIG. 20. The flush arrangement of the flush-mounted piston/valve allows the piston to travel further in the cylinder (e.g. top position in cylinder), resulting in more compressed air per stroke. During the down stroke (i.e. right view, FIG. 20B), air is drawn up the cylinder and through the piston through the through holes due to the circular-shape seal 717G, 717G', 717G" flexing upwardly at its edges to unseal the round perimeter of the circular-shaped seal as shown.

Self-Calibrating Pressure Gauge

Figure 21:
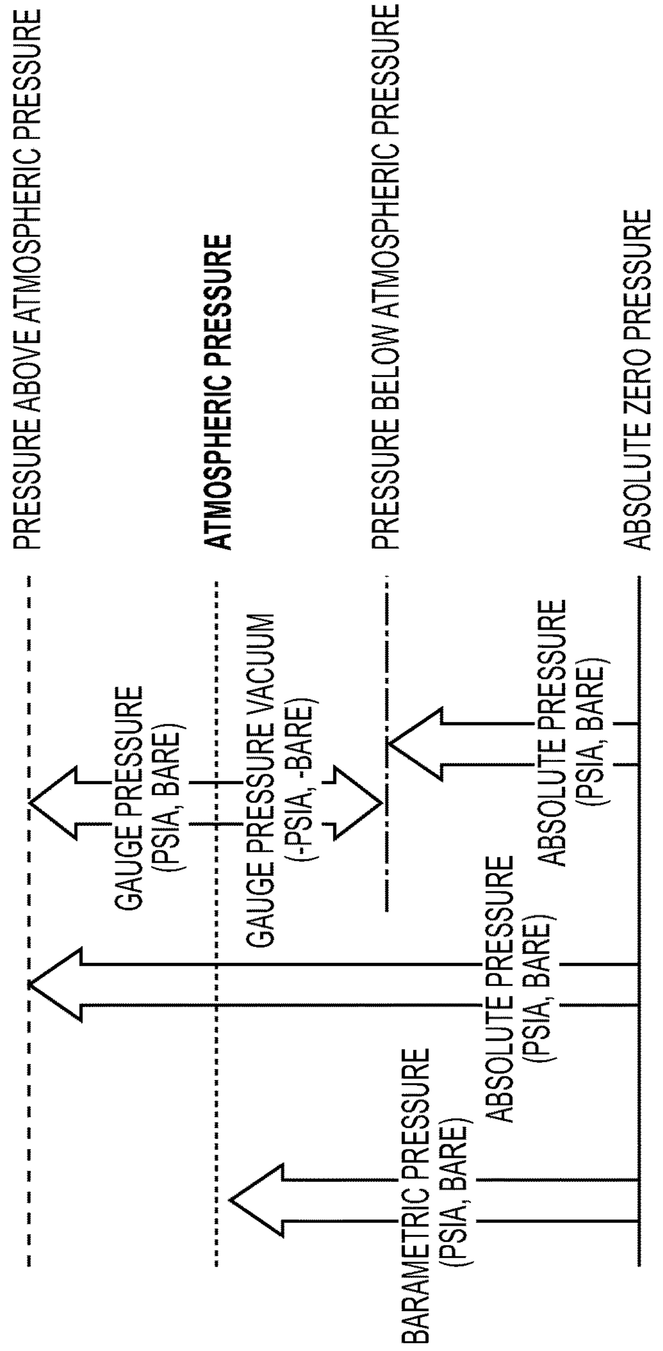
FIG. 21 is a diagrammatic view of self-calibrating pressure gauge operation.

The gauge pressure is the air pressure measurement that is needed to obtain accurate tire pressure at any elevation, temperature, etc. To measure the air pressure digitally, without using an analog gauge, two (2) pressure sensors are needed, as shown in FIG. 21, including one that measures atmospheric pressure and another one that measures absolute pressure. The gauge pressure is then obtained by subtracting the atmospheric pressure from the absolute pressure, as shown in the figure on the right side.

The absolute pressure sensor will be a 0-700 KPA (0-101.53 PSI) sensor which makes the pressure just outside the cylinder head. The atmospheric pressure sensor will be a 0-150 KPS (0-21.76 PSI) sensor to accurately measure the ambient pressure.

Capturing gauge pressure digitally also allows automatically shutting off the unit at the user set pressure.

Vacuum Cleaner

The present invention can be directed to a vacuum cleaner device, air compressor and vacuum cleaner device, and a vacuum cleaner and air compressor, and jump starter device.

For example, the air compressor with jump starter device shown in FIGS. 8-10 can be modified to include vacuum cleaner components. For example, a waste collection container or bin can be added to the device shown in FIGS. 8-10 to collect waste (e.g. bin that hinges outwardly or removable from cover or body, removable vacuum bag or collection cup), and the fan motor is configured to cool device and provide suction for the vacuum cleaner. Alternatively, vacuum components are added to the device shown in FIGS. 8-10.

The Li-ion battery can be configured to power the air compressor, jump starter, and/or vacuum cleaner (e.g. power to all components from single battery, or selectively connected to battery).

The invention claimed is:

1. A portable jump starter and air compressor device, comprising:

one or more rechargeable batteries;

a jump starter connected to and powered the one or more rechargeable batteries; and an air compressor, comprising:

an electrical motor connected to and powered by the one or more rechargeable batteries, and an air compressor unit connected to and driven by the electrical motor, the air compressor unit including a piston assembly having a piston, the piston comprising:

a lower piston having a center hole, a piston ring connected to the lower piston, an upper piston having an indent or cavity on a top of the upper piston, and a seal positioned in the indent or cavity of the upper piston, the seal and the top of the upper piston being substantially flush.

2. The portable jump starter and air compressor device of claim 1, the piston assembly further comprising a connecting rod, the piston mounted on the connecting rod.

3. The portable jump starter and air compressor device of claim 1, the piston assembly further comprising a screw securing the seal to the upper piston, a top of the screw substantially flush with the top of the upper piston and the seal.

4. The portable jump starter and air compressor device of claim 1, wherein the upper piston includes a plurality of radial protrusions and wherein the seal includes a plurality of radial slots configured to mount within the plurality of radial protrusions.

5. The portable jump starter and air compressor device of claim 1, wherein the lower piston, the piston ring, the upper piston, and the seal are circular-shaped.

6. The portable jump starter and air compressor device of claim 1, the lower piston further comprising a plurality of through holes surrounding the center hole.

7. The portable jump starter and air compressor of claim 1, the air compressor further comprising a cylinder, the piston configured to travel within the cylinder.

8. The portable jump starter and air compressor of claim 7, the upper piston further comprising one or more through holes.

9. The portable jump starter and air compressor of claim 8, wherein during a down-stroke of the piston, air is drawn through the one or more through holes of the upper piston.

10. The portable jump starter and air compressor of claim 9, wherein during the down-stroke of the piston, the air drawn through the one or more through holes of the upper piston causes a perimeter of the seal to unseal the upper piston.

11. A piston assembly for an air compressor, the piston assembly comprising:

a cylinder; and a piston configured to travel within the cylinder, the piston including:

a lower piston having a center hole, a piston ring connected to the lower piston, an upper piston having an indent or cavity on a top of the upper piston and comprising one or more through holes, and a seal positioned in the indent or cavity of the upper piston, the seal and the top of the upper piston being substantially flush, wherein during a down-stroke of the piston, air is drawn through the one or more through holes of the upper piston.

12. The piston assembly of claim 11, further comprising a connecting rod, the piston mounted on the connecting rod.

13. The piston assembly of claim 11, further comprising a screw securing the seal to the upper piston, a top of the screw substantially flush with the top of the upper piston and the seal.

14. The piston assembly of claim 11, wherein during the down-stroke of the piston, the air drawn through the one or more through holes of the upper piston causes a perimeter of the seal to unseal the upper piston.

* * * * *